US012677182B2

(12) United States Patent
Hofmann et al.

(10) Patent No.: US 12,677,182 B2
(45) Date of Patent: Jul. 7, 2026

(54) SYSTEMS, METHODS, AND DEVICES FOR LEVEL-BASED NETWORK SERVICE QUALITY

(71) Applicant: Apple Inc., Cupertino, CA (US)

(72) Inventors: Christian Hofmann, Munich (DE); Tarik Tabet, Carlsbad, CA (US); Panagiotis Botsinis, Munich (DE); Amr Abdelrahman Yousef A. Mostafa, Munich (DE); Alperen Gundogan, Munich (DE); Milan Zivkovic, Munich (DE); Lakshmi Iyer, Cupertino, CA (US); Sameh M. Eldessoki, Munich (DE)

(73) Assignee: Apple Inc., Cupertino, CA (US)

( * ) Notice: Subject to any disclaimer, the term of this patent is extended or adjusted under 35 U.S.C. 154(b) by 37 days.

(21) Appl. No.: 18/586,181

(22) Filed: Feb. 23, 2024

(65) Prior Publication Data

US 2025/0274802 A1 Aug. 28, 2025

(51) Int. Cl.
*H04W 28/02* (2009.01)

(52) U.S. Cl.
CPC ... *H04W 28/0215* (2013.01); *H04W 28/0236* (2013.01); *H04W 28/0268* (2013.01)

(58) Field of Classification Search
CPC ......... H04W 28/0215; H04W 28/0236; H04W 28/0268
See application file for complete search history.

(56) References Cited

U.S. PATENT DOCUMENTS

| | | | | |
|---|---|---|---|---|
| 2017/0317894 A1* | 11/2017 | Dao | | H04L 41/5009 |
| 2020/0260318 A1* | 8/2020 | Kousaridas | | H04W 28/0268 |
| 2021/0136620 A1* | 5/2021 | Laitila | | H04W 28/06 |
| 2022/0159504 A1* | 5/2022 | Wei | | H04W 28/0268 |
| 2022/0295338 A1* | 9/2022 | Ebrahim Rezagah | | |
| | | | | H04W 36/24 |
| 2022/0312509 A1* | 9/2022 | Kim | | H04W 76/10 |
| 2024/0314841 A1* | 9/2024 | Hande | | H04W 76/28 |

FOREIGN PATENT DOCUMENTS

| | | | | | |
|---|---|---|---|---|---|
| WO | WO-2016192783 A1 * | 12/2016 | | | H04W 28/24 |
| WO | WO-2020198317 A1 * | 10/2020 | | | H04W 72/0453 |
| WO | WO-2022122128 A1 * | 6/2022 | | | H04W 28/0268 |

* cited by examiner

*Primary Examiner* — Patrice L Winder
(74) *Attorney, Agent, or Firm* — Kubota & Basol LLP

(57) ABSTRACT

Described herein are solutions for level-based network service quality. A user equipment (UE) may determine multiple quality level profiles corresponding to an application, network service, or data flow. The quality level profiles may each include different set of attributes relating to a quality of service (QoS), such as a burst size, burst cadence, delay budget, etc. The UE may register the quality level profiles with a base station serving the UE, and the base station may provide service to the UE based on one of the quality level profiles. When network conditions change and the current quality level profile is unsuitable, the base station may select a more suitable quality level profile and notify the UE of the change in quality level profile. The UE may adjust UL transmissions in accordance with the new quality level profile. These and other features and examples are described herein.

17 Claims, 19 Drawing Sheets

500

| PROFILE ATTRIBUTE(S) | QUALITY LEVEL PROFILE X ("LOW") | QUALITY LEVEL PROFILE Y ("MEDIUM") | QUALITY LEVEL PROFILE Z ("HIGH") | ... |
|---|---|---|---|---|
| BURST SIZE | SIZE_X | SIZE_Y | SIZE_Z | ... |
| BURST CADENCE | CADENCE_X | CADENCE_Y | CADENCE_Z | ... |
| DELAY BUDGET | BUDGET_X | BUDGET_Y | BUDGET_Y | ... |
| ... | ... | ... | ... | ... |

DETERMINE QUALITY LEVEL PROFILES FOR UL COMMUNICATIONS, EACH QUALITY LEVEL PROFILE CORRESPONDING TO A DISTINCT BIT RATE — 1610

COMMUNICATE ACCORDING TO A BIT RATE OF A FIRST QUALITY LEVEL PROFILE — 1620

DETERMINE CHANGE FROM FIRST QUALITY LEVEL PROFILE TO SECOND QUALITY LEVEL PROFILE — 1630

COMMUNICATE ACCORDING TO BIT RATE OF SECOND QUALITY LEVEL PROFILE — 1640

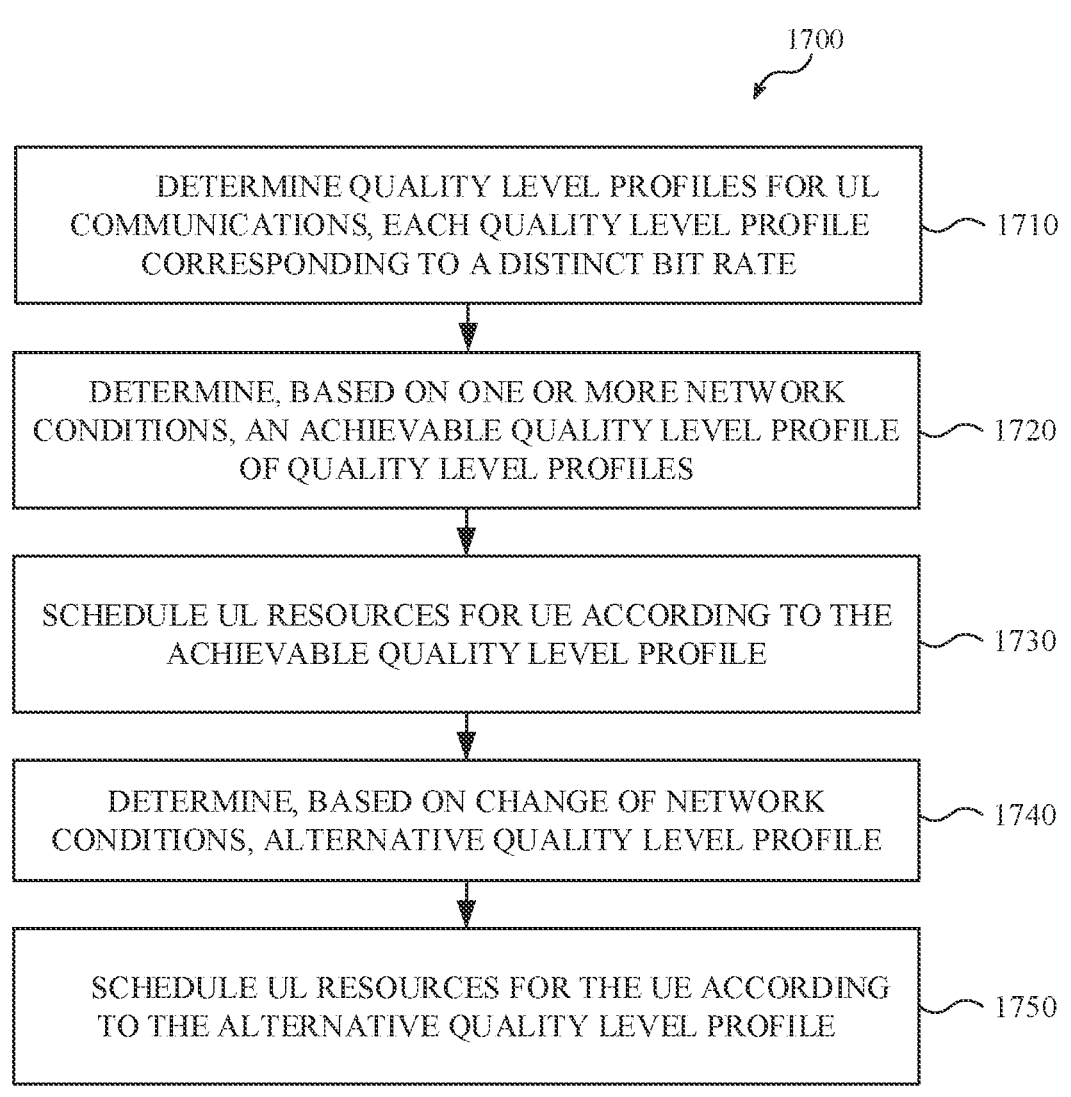

1700

DETERMINE QUALITY LEVEL PROFILES FOR UL COMMUNICATIONS, EACH QUALITY LEVEL PROFILE CORRESPONDING TO A DISTINCT BIT RATE — 1710

DETERMINE, BASED ON ONE OR MORE NETWORK CONDITIONS, AN ACHIEVABLE QUALITY LEVEL PROFILE OF QUALITY LEVEL PROFILES — 1720

SCHEDULE UL RESOURCES FOR UE ACCORDING TO THE ACHIEVABLE QUALITY LEVEL PROFILE — 1730

DETERMINE, BASED ON CHANGE OF NETWORK CONDITIONS, ALTERNATIVE QUALITY LEVEL PROFILE — 1740

SCHEDULE UL RESOURCES FOR THE UE ACCORDING TO THE ALTERNATIVE QUALITY LEVEL PROFILE — 1750

*FIG. 17*

SYSTEMS, METHODS, AND DEVICES FOR LEVEL-BASED NETWORK SERVICE QUALITY

FIELD

This disclosure relates to wireless communication networks and mobile device capabilities.

BACKGROUND

Wireless communication networks and wireless communication services are becoming increasingly dynamic, complex, and ubiquitous. For example, some wireless communication networks may be developed to implement fourth generation (4G), fifth generation (5G) or new radio (NR) technology. Such technology may include solutions for enabling user equipment (UE) and network devices, such as base stations, to communicate with one another. Some scenarios may involve network services at one or more levels of quality.

BRIEF DESCRIPTION OF THE DRAWINGS

The present disclosure will be readily understood and enabled by the detailed description and accompanying figures of the drawings. Like reference numerals may designate like features and structural elements. Figures and corresponding descriptions are provided as non-limiting examples of aspects, implementations, etc., of the present disclosure, and references to "an" or "one" aspect, implementation, etc., may not necessarily refer to the same aspect, implementation, etc., and may mean at least one, one or more, etc.

FIG. 5 is a diagram of an example data structure for quality level profiles according to one or more implementations described herein.

FIG. 17 is a diagram of an example process of level-based network service quality according to one or more implementations described herein.

DETAILED DESCRIPTION

Figure 1:
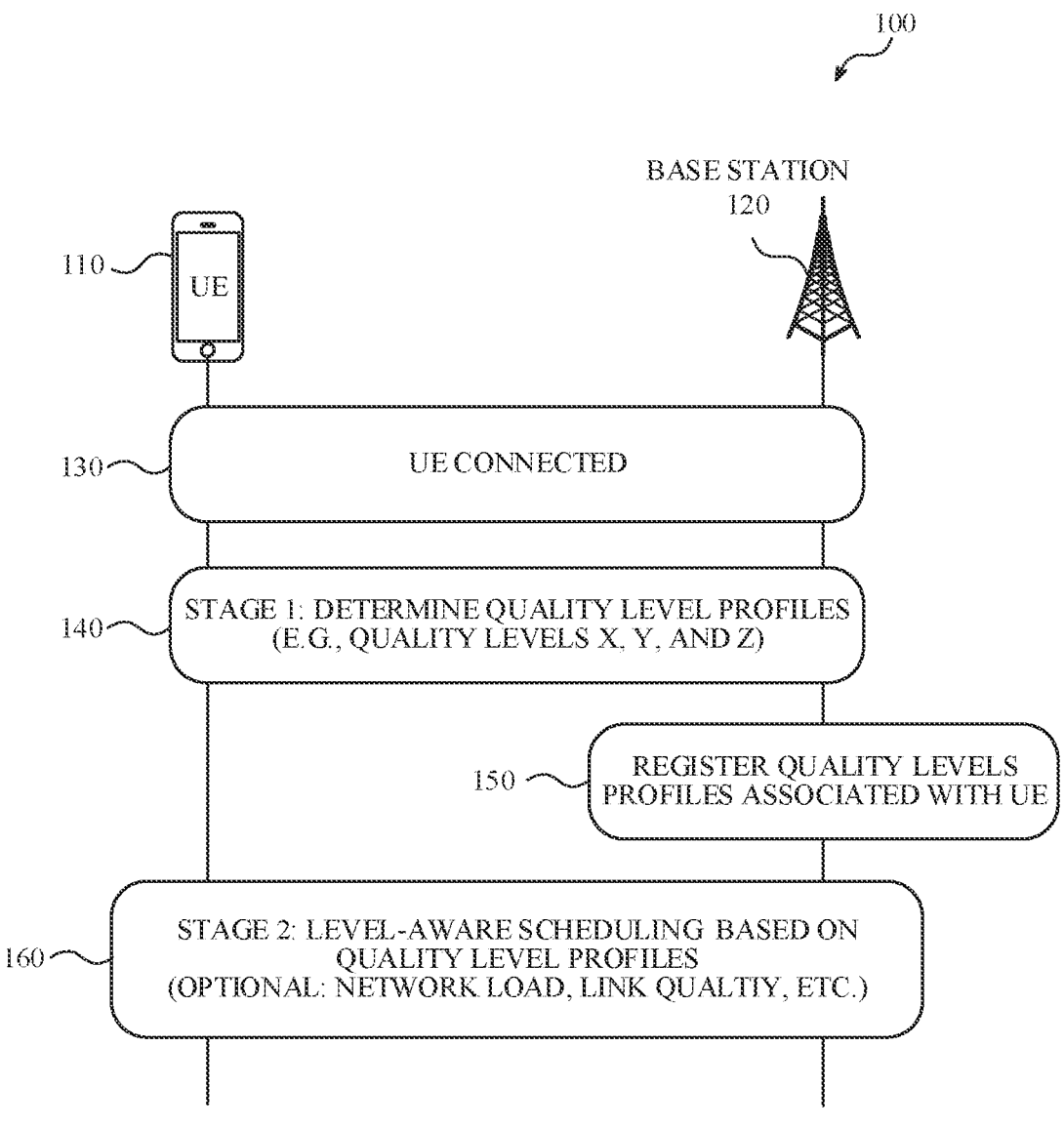
FIG. 1 is a diagram of an example of an overview according to one or more implementations described herein.

The following detailed description refers to the accompanying drawings. Like reference numbers in different drawings may identify the same or similar features, elements, operations, etc. Additionally, the present disclosure is not limited to the following description as other implementations may be utilized, and structural or logical changes made, without departing from the scope of the present disclosure.

Telecommunication networks may include user equipment (UEs) capable of communicating with base stations and/or other network access nodes. UEs and base stations may implement various techniques and communications standards for enabling UEs and base stations to discover one another, establish and maintain connectivity, and exchange information in an ongoing manner. Cohesive, reliable, and satisfactory wireless communications may involve allocated appropriate resources (e.g., time and frequency resources) for both uplink (UL) and downlink (DL) communications.

Quality of service (QoS) may refer to a degree or level of network service provided to a UE for one or more data flows. A QoS may therefore be characterized by a bandwidth, delay or latency, packet loss, jitter, etc., and the QoS proscribed for some network services may be different than those of other network services. For example, a time-sensitive network service with a high data throughput, such as voice, video, virtual-reality (VR), extended-reality (XR), etc., may call for a higher QoS than a less time-sensitive network service with a lower data throughput. As such, a QoS may be associated with a type of data flow.

For UL communications, a QoS for a particular data flow may be associated with UL resources allocated by a base station (also referred to herein as a "UL grant"). A UE may obtain UL resources via a scheduling request (SR) or a UL grant. Each of these approaches may involve a buffer status report (BSR) for resource planning and allocation. As a UE generates data for UL transmission, the UE may place the data in a local buffer. The UE may monitor and measure the data stored in the buffer, and periodically send BSRs to the base station. The base station may use the BSRs to determine and communicate UL grants to the UE.

A guaranteed bit rate (GBR) QoS flow may include a QoS profile consisting of one or more attributes, such as a packet delay budget (PDB), a guaranteed flow bit rate (GFBR), a maximum flow bit rate (MFBR), a maximum packet loss rate, etc. In some scenarios, a GBR QoS flow may have one or more alternative QoS profiles, each with a different set of attributes. Changing between QoS profiles may involve a base station determining that a current QoS profile is unsustainable and communicating with a core network (CN) to update the GBR QoS flow according to an alternative QoS profile. When the alternative QoS profile has been applied to the base station and CN, the base station may notify the UE of the change in QoS profiles. Updating a GBR QoS flow, by switching between QoS profiles, may therefore involve considerable time and lack any input from the UE Further complicating things, UL grants may change from the GFBR of the original QoS profile to a GFBR of the alternative QoS profile when the base station determines that the original QoS profile is unsustainable (instead of when the UE is notified about the change in QoS profiles). As such, the UE may continue generating and buffering packets of a given size and rate based on a GFBR of the original QoS profile even though the base station has already switched to UL grants consistent with a GFBR of the alternative QoS profile. The UE may continue doing so until after the GBR QoS flow is updated between the base station and CN and the base station notifies the UE of the alternative QoS profile.

The UE may therefore have generated and buffered too many packets and packets that are too large for the UL grants being provided under the GBR of the alternative QoS profile, resulting in further delays, lost packets, greater latency, disruption in service, and so on. Furthermore, as a QoS profile becoming unsustainable may often result from a network-wide issue or conditions, such as network congestions, too much network load, signal interference, etc., the difficulties and complications of changing the QoS profile for a GBR QoS flow of one UE may be multiplied as the network-wide issue or conditions may have similarly disrupted the QoS for many UEs.

One or more of the techniques described herein may address these and other deficiencies by providing solution based on level-based network serves quality that may be indicated and/or detected by the UE. A UE and base station may negotiate quality level profiles associated with a set of parameters defining a QoS, such as a bitrate, packet size, packet rate, burst size, delay budget, etc. The UE and base station may negotiate the quality level profiles using a media access control (MAC) control element (CE), a buffer status report (BSR), a periodic cadence report (PCR), a radio resource control (RRC) message, network access stratum (NAS) signaling, or another type of signaling mechanism or message.

The UE and base station may use the quality level profiles via explicit indication or implicit indication. For example, in some scenarios, the base station may explicitly indicate to the UE which quality level profile is currently supported by the network. This may be done, for example, as part of a UL grant or another type of message or signaling mechanism. In other scenarios, the base station may implicitly indicate to the UE (or without indication) which quality level profile is currently supported by the network. This may include the quality level profiles being mapped to one or more metrics or conditions that the UE may monitor or periodically measure. An example of such a metric may include a signal interference noise ratio (SINR), reference signal received power (RSRP), reference signal received quality (RSRQ), etc. As such, when the UE measures or determines the specified metric, the UE may independently determine which quality level profile is currently supported by the network.

As such, whether by explicit or implicit indication, the techniques described herein may enable the UE to quickly determine a change in a QoS profile based on the quality level profiles determined or negotiated by the UE and the base station in advance. Further, upon determining that a different quality level profile is being supported by the network, the UE may indicate the change in network service to a transport layer and/or application of the UE, so that packets generated and buffered by the UE may be immediately consistent with changes in UL grants from the base station (e.g., instead of having to wait for the base station to first address the change in service with the network and then notify the UE).

FIG. 1 is a diagram of an example overview 100 according to one or more implementations described herein. As shown, example overview 100 may include UE 110 and base station 120. UE 110 and base station 120 may have completed an attachment procedure, such that UE is in a UE connected state (at 130). The level-based network service quality techniques may be described as having a first stage and a second stage. During a first stage, UE 110 and base station 120 may determine or negotiate discrete quality level profiles (also referred to herein as "quality levels", "network service quality levels," etc.) (at 140). A quality level profile may be characterized by different degrees or levels of network service quality (at 140). Each quality level profile may be associated with one or more UL transmission resources, conditions, or attributes, such as a transmission burst size, burst cadence, delay budget, etc.

In some implementations, UE 110 may determine the quality level profiles and communicate them to base station 120. In some implementations, upon receiving quality levels from UE 110, base station 120 may determine verify whether the qualities levels are acceptable, and when the quality levels are not acceptable, may provide UE 110 with an alternative set of quality levels (not shown). Base station 120 may register the quality levels associated with UE 110 (at 150), such that UE 110 and base station 120 are each aware of the quality level profiles associated with UE 110.

During a second stage UE 110 and base station 120 may engage in level-aware scheduling (of UL transmission resources) based on the quality level profiles associated with UE 110 (at 160). This may include base station 120 monitoring a current level of network service relative to a current quality level profile. The current level of network service may be evaluated based on one or more factors or conditions, such as a bit rate associated with UL transmissions, a link capacity, a data throughput, a level of congestion or signal interference at base station 120, and more. In some implementations, base station 120 may also receive information from one or more core network functions relating to changes in levels of services (e.g., network load, link quality, etc.).

Base station 120 may determine when network conditions are such that base station 120 is no longer able to support the current quality level profile. In such a scenario, base station 120 may identify a quality level profile that base station 120 may support given the current network conditions and informing UE 110 of the change in quality level profiles. In response, UE 110 may determine the characteristics of the updated quality level profile (transmission burst size, burst cadence, delay budget, etc.) and immediately adapt internal operations and UL transmissions to the characteristics of the identified quality level profile.

For example, when UE 110 is notified of a transition from a higher service level profile to a lower service level profile, UE 110 may immediately change a size of a UL transmission buffer, and a rate at which data is generated and placed in the buffer, to be consistent with the lower service level profile. As such, the techniques described herein may enable UEs 110 and base station 120 to use quality level profiles to respond faster to changes in available UL resources than solutions involving a SR, UL grants, etc. These and other features are described in additional detail with reference to remaining Figures.

5

Figure 2:
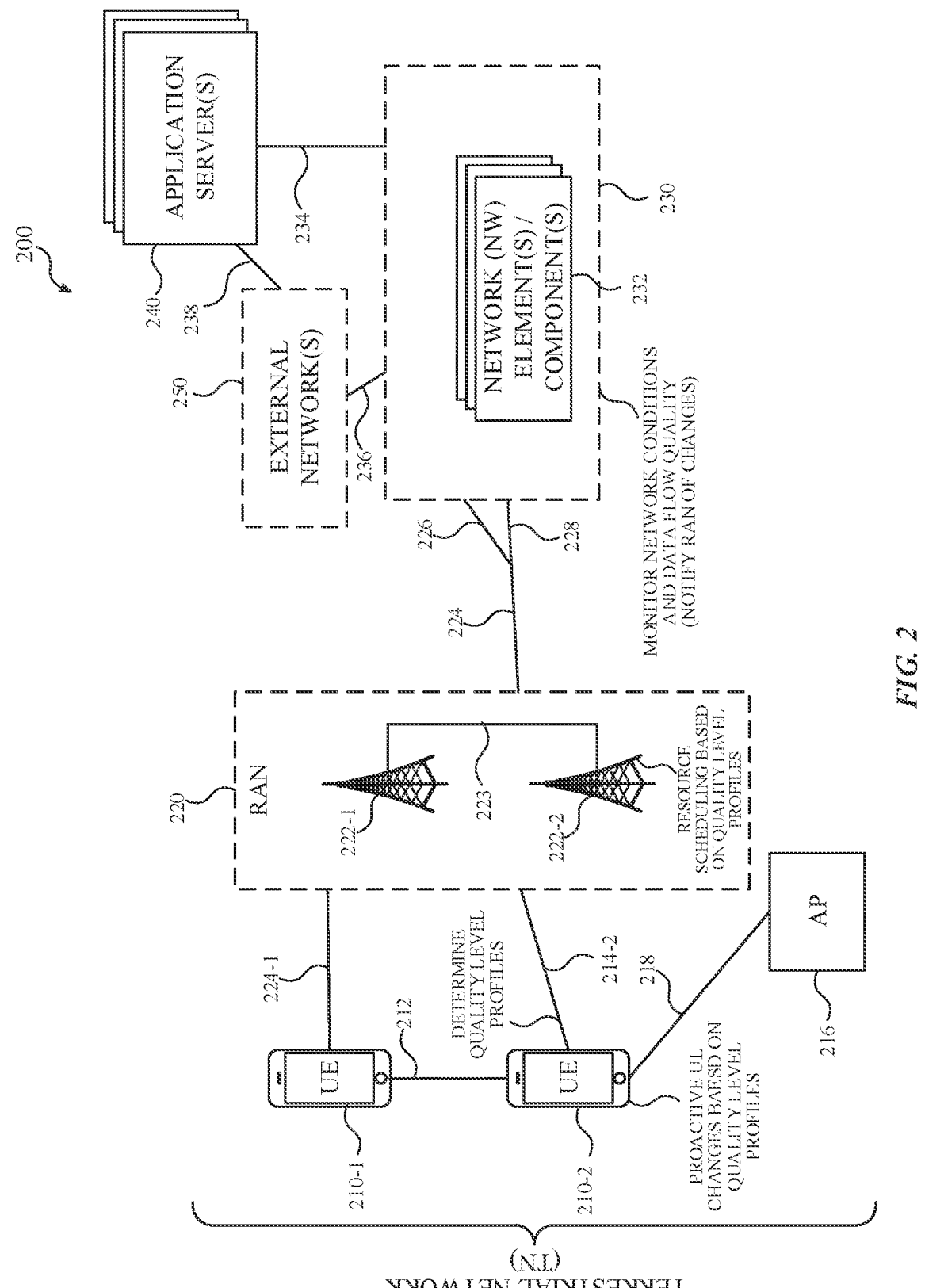
FIG. 2 is a diagram of an example network according to one or more implementations described herein.

FIG. 2 is an example network 200 according to one or more implementations described herein. Example network 200 may include UEs 210, 210-2, etc. (referred to collectively as "UEs 210" and individually as "UE 210"), a radio access network (RAN) 220, a core network (CN) 230, application servers 240, and external networks 250.

The systems and devices of example network 200 may operate in accordance with one or more communication standards, such as 2nd generation (2G), 3rd generation (3G), 4th generation (4G) (e.g., long-term evolution (LTE)), and/ or 5th generation (5G) (e.g., new radio (NR)) communication standards of the 3rd generation partnership project (3GPP). Additionally, or alternatively, one or more of the systems and devices of example network 200 may operate in accordance with other communication standards and protocols discussed herein, including future versions or generations of 3GPP standards (e.g., sixth generation (6G) standards, seventh generation (7G) standards, etc.), institute of electrical and electronics engineers (IEEE) standards (e.g., wireless metropolitan area network (WMAN), worldwide interoperability for microwave access (WiMAX), etc.), and more.

As shown, UEs 210 may include smartphones (e.g., handheld touchscreen mobile computing devices connectable to one or more wireless communication networks). Additionally, or alternatively, UEs 210 may include other types of mobile or non-mobile computing devices capable of wireless communications, such as personal data assistants (PDAs), pagers, laptop computers, desktop computers, wireless handsets, etc. In some implementations, UEs 210 may include internet of things (IoT) devices (or IoT UEs) that may comprise a network access layer designed for low-power IoT applications utilizing short-lived UE connections. Additionally, or alternatively, an IoT UE may utilize one or more types of technologies, such as machine-to-machine (M2M) communications or machine-type communications (MTC) (e.g., to exchanging data with an MTC server or other device via a public land mobile network (PLMN)), proximity-based service (ProSe) or device-to-device (D2D) communications, sensor networks, IoT networks, and more. Depending on the scenario, an M2M or MTC exchange of data may be a machine-initiated exchange, and an IoT network may include interconnecting IoT UEs (which may include uniquely identifiable embedded computing devices within an Internet infrastructure) with short-lived connections. In some scenarios, IoT UEs may execute background applications (e.g., keep-alive messages, status updates, etc.) to facilitate the connections of the IoT network.

UEs 210 may communicate and establish a connection with one or more other UEs 210 via one or more wireless channels 212, each of which may comprise a physical communications interface/layer. The connection may include an M2M connection, MTC connection, D2D connection, SL connection, etc. The connection may involve a PC5 interface. In some implementations, UEs 210 may be configured to discover one another, negotiate wireless resources between one another, and establish connections between one another, without intervention or communications involving RAN node 222 or another type of network node. In some implementations, discovery, authentication, resource negotiation, registration, etc., may involve communications with RAN node 222 or another type of network node.

UEs 210 may use one or more wireless channels 212 to communicate with one another. As described herein, UE 210 may communicate with RAN node 222 to request SL resources. RAN node 222 may respond to the request by providing UE 210 with a dynamic grant (DG) or configured grant (CG) regarding SL resources. A DG may involve a grant based on a grant request from UE 210. A CG may involve a resource grant without a grant request and may be based on a type of service being provided (e.g., services that have strict timing or latency requirements). UE 210 may perform a clear channel assessment (CCA) procedure based on the DG or CG, select SL resources based on the CCA procedure and the DG or CG; and communicate with another UE 210 based on the SL resources. The UE 210 may communicate with RAN node 222 using a licensed frequency band and communicate with the other UE 210 using an unlicensed frequency band.

UEs 210 may communicate and establish a connection with (e.g., be communicatively coupled) with RAN 220, which may involve one or more wireless channels 214-1 and 214-2, each of which may comprise a physical communications interface/layer. In some implementations, a UE may be configured with dual connectivity (DC) as a multi-radio access technology (multi-RAT) or multi-radio dual connectivity (MR-DC), where a multiple receive and transmit (Rx/Tx) capable UE may use resources provided by different network nodes (e.g., 222-1 and 222-2) that may be connected via non-ideal backhaul (e.g., where one network node provides NR access and the other network node provides either E-UTRA for LTE or NR access for 5G). In such a scenario, one network node may operate as a master node (MN) and the other as the secondary node (SN). The MN and SN may be connected via a network interface, and at least the MN may be connected to the CN 230. Additionally, at least one of the MN or the SN may be operated with shared spectrum channel access, and functions specified for UE 210 can be used for an integrated access and backhaul mobile termination (IAB-MT). Similar for UE 210, the IAB-MT may access the network using either one network node or using two different nodes with enhanced dual connectivity (EN-DC) architectures, new radio dual connectivity (NR-DC) architectures, or the like. In some implementations, a base station (as described herein) may be an example of network node 222.

As described herein, UE 210 may receive and store one or more configurations, instructions, and/or other information for enabling SL-U communications with quality and priority standards. A PQI may be determined and used to indicate a QoS associated with an SL-U communication (e.g., a channel, data flow, etc.). Similarly, an L1 priority value may be determined and used to indicate a priority of an SL-U transmission, SL-U channel, SL-U data, etc. The PQI and/or L1 priority value may be mapped to a CAPC value, and the PQI, L1 priority, and/or CAPC may indicate SL channel occupancy time (COT) sharing, maximum (MCOT), timing gaps for COT sharing, LBT configuration, traffic and channel priorities, and more.

As shown, UE 210 may also, or alternatively, connect to access point (AP) 216 via connection interface 218, which may include an air interface enabling UE 210 to communicatively couple with AP 216. AP 216 may comprise a wireless local area network (WLAN), WLAN node, WLAN termination point, etc. The connection 216 may comprise a local wireless connection, such as a connection consistent with any IEEE 702.11 protocol, and AP 216 may comprise a wireless fidelity (Wi-Fi®) router or other AP. While not explicitly depicted in FIG. 2, AP 216 may be connected to another network (e.g., the Internet) without connecting to RAN 220 or CN 230. In some scenarios, UE 210, RAN 220, and AP 216 may be configured to utilize LTE-WLAN aggregation (LWA) techniques or LTE WLAN radio level integration with IPsec tunnel (LWIP) techniques. LWA may involve UE 210 in RRC_CONNECTED being configured by RAN 220 to utilize radio resources of LTE and WLAN. LWIP may involve UE 210 using WLAN radio resources (e.g., connection interface 218) via IPsec protocol tunneling to authenticate and encrypt packets (e.g., Internet Protocol (IP) packets) communicated via connection interface 218. IPsec tunneling may include encapsulating the entirety of original IP packets and adding a new packet header, thereby protecting the original header of the IP packets.

RAN 220 may include one or more RAN nodes 222-1 and 222-2 (referred to collectively as RAN nodes 222, and individually as RAN node 222) that enable channels 214-1 and 214-2 to be established between UEs 210 and RAN 220. RAN nodes 222 may include network access points configured to provide radio baseband functions for data and/or voice connectivity between users and the network based on one or more of the communication technologies described herein (e.g., 2G, 3G, 4G, 5G, WiFi®, etc.). As examples therefore, a RAN node may be an E-UTRAN Node B (e.g., an enhanced Node B, eNodeB, eNB, 4G base station, etc.), a next generation base station (e.g., a 5G base station, NR base station, next generation eNBs (gNB), etc.). RAN nodes 222 may include a roadside unit (RSU), a transmission reception point (TRxP or TRP), and one or more other types of ground stations (e.g., terrestrial access points). In some scenarios, RAN node 222 may be a dedicated physical device, such as a macrocell base station, and/or a low power (LP) base station for providing femtocells, picocells or the like having smaller coverage areas, smaller user capacity, or higher bandwidth compared to macrocells.

Some or all of RAN nodes 222, or portions thereof, may be implemented as one or more software entities running on server computers as part of a virtual network, which may be referred to as a centralized RAN (CRAN) and/or a virtual baseband unit pool (vBBUP). In these implementations, the CRAN or vBBUP may implement a RAN function split, such as a packet data convergence protocol (PDCP) split wherein radio resource control (RRC) and PDCP layers may be operated by the CRAN/vBBUP and other Layer 2 (L2) protocol entities may be operated by individual RAN nodes 222; a media access control (MAC)/physical (PHY) layer split wherein RRC, PDCP, radio link control (RLC), and MAC layers may be operated by the CRAN/vBBUP and the PHY layer may be operated by individual RAN nodes 222; or a "lower PHY" split wherein RRC, PDCP, RLC, MAC layers and upper portions of the PHY layer may be operated by the CRAN/vBBUP and lower portions of the PHY layer may be operated by individual RAN nodes 222. This virtualized framework may allow freed-up processor cores of RAN nodes 222 to perform or execute other virtualized applications.

In some implementations, an individual RAN node 222 may represent individual gNB-distributed units (DUs) connected to a gNB-control unit (CU) via individual F1 or other interfaces. In such implementations, the gNB-DUs may include one or more remote radio heads or radio frequency (RF) front end modules (RFEMs), and the gNB-CU may be operated by a server (not shown) located in RAN 220 or by a server pool (e.g., a group of servers configured to share resources) in a similar manner as the CRAN/vBBUP.

Additionally, or alternatively, one or more of RAN nodes 222 may be next generation eNBs (i.e., gNBs) that may provide evolved universal terrestrial radio access (E-UTRA) user plane and control plane protocol terminations toward UEs 210, and that may be connected to a 5G core network (5GC) 230 via an NG interface.

Any of the RAN nodes 222 may terminate an air interface protocol and may be the first point of contact for UEs 210. In some implementations, any of the RAN nodes 222 may fulfill various logical functions for the RAN 220 including, but not limited to, radio network controller (RNC) functions such as radio bearer management, uplink and downlink dynamic radio resource management and data packet scheduling, and mobility management. UEs 210 may be configured to communicate using orthogonal frequency-division multiplexing (OFDM) communication signals with each other or with any of the RAN nodes 222 over a multicarrier communication channel in accordance with various communication techniques, such as, but not limited to, an OFDMA communication technique (e.g., for downlink communications) or a single carrier frequency-division multiple access (SC-FDMA) communication technique (e.g., for uplink and ProSe or sidelink (SL) communications), although the scope of such implementations may not be limited in this regard. The OFDM signals may comprise a plurality of orthogonal subcarriers.

In some implementations, a downlink resource grid may be used for downlink transmissions from any of the RAN nodes 222 to UEs 210, and uplink transmissions may utilize similar techniques. The grid may be a time-frequency grid (e.g., a resource grid or time-frequency resource grid) that represents the physical resource for downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises resource blocks, which describe the mapping of certain physical channels to resource elements. Each resource block may comprise a collection of resource elements (REs); in the frequency domain, this may represent the smallest quantity of resources that currently may be allocated. There are several different physical downlink channels that are conveyed using such resource blocks.

Further, RAN nodes 222 may be configured to wirelessly communicate with UEs 210, and/or one another, over a licensed medium (also referred to as the "licensed spectrum" and/or the "licensed band"), an unlicensed shared medium (also referred to as the "unlicensed spectrum" and/or the "unlicensed band"), or combination thereof. A licensed spectrum may correspond to channels or frequency bands selected, reserved, regulated, etc., for certain types of wireless activity (e.g., wireless telecommunication network activity), whereas an unlicensed spectrum may correspond to one or more frequency bands that are not restricted for certain types of wireless activity. Whether a particular frequency band corresponds to a licensed medium or an unlicensed medium may depend on one or more factors, such as frequency allocations determined by a public-sector organization (e.g., a government agency, regulatory body, etc.) or frequency allocations determined by a private-sector organization involved in developing wireless communication standards and protocols, etc.

To operate in the unlicensed spectrum, UEs 210 and the RAN nodes 222 may operate using stand-alone unlicensed operation, licensed assisted access (LAA), eLAA, and/or feLAA mechanisms. In these implementations, UEs 210 and the RAN nodes 222 may perform one or more known medium-sensing operations or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

The physical downlink shared channel (PDSCH) may carry user data and higher layer signaling to UEs 210. The physical downlink control channel (PDCCH) may carry information about the transport format and resource allocations related to the PDSCH channel, among other things. The PDCCH may also inform UEs 210 about the transport format, resource allocation, and hybrid automatic repeat request (HARQ) information related to the uplink shared channel. Typically, downlink scheduling (e.g., assigning control and shared channel resource blocks to UE 210 within a cell) may be performed at any of the RAN nodes 222 based on channel quality information fed back from any of UEs 210. The downlink resource assignment information may be sent on the PDCCH used for (e.g., assigned to) each of UEs 210.

One or more of the techniques, described herein, may enable level-based network service quality. UE 210 may determine multiple quality level profiles corresponding to an application, network service, or data flow. The quality level profiles may each include a different set of attributes relating to a QoS, such as a burst size, burst cadence, delay budget, etc. The UE may register the quality level profiles with base station 222, and base station 222 may provide service to UE 210 based on one of the quality level profiles. When network conditions change, and the current quality level profile is unsuitable, base station 222 may select a more suitable quality level profile and notify UE 210 of the change in quality level profile. UE 210 may then immediately begin adjusting UL transmissions in accordance with the new quality level profile. Information and instructions 1855 may enable these and many other features and examples descried herein.

The RAN nodes 222 may be configured to communicate with one another via interface 223. In implementations where the system is an LTE system, interface 223 may be an X2 interface. In NR systems, interface 223 may be an Xn interface. The X2 interface may be defined between two or more RAN nodes 222 (e.g., two or more eNBs/gNBs or a combination thereof) that connect to evolved packet core (EPC) or CN 230, or between two eNBs connecting to an EPC. In some implementations, the X2 interface may include an X2 user plane interface (X2-U) and an X2 control plane interface (X2-C). The X2-U may provide flow control mechanisms for user data packets transferred over the X2 interface and may be used to communicate information about the delivery of user data between eNBs or gNBs. For example, the X2-U may provide specific sequence number information for user data transferred from a master eNB (MeNB) to a secondary eNB (SeNB); information about successful in sequence delivery of PDCP packet data units (PDUs) to a UE 210 from an SeNB for user data; information of PDCP PDUs that were not delivered to a UE 210; information about a current minimum desired buffer size at the SeNB for transmitting to the UE user data; and the like. The X2-C may provide intra-LTE access mobility functionality (e.g., including context transfers from source to target eNBs, user plane transport control, etc.), load management functionality, and inter-cell interference coordination functionality.

As shown, RAN 220 may be connected (e.g., communicatively coupled) to CN 230. CN 230 may comprise a plurality of network elements 232, which are configured to offer various data and telecommunications services to customers/subscribers (e.g., users of UEs 210) who are connected to the CN 230 via the RAN 220. In some implementations, CN 230 may include an evolved packet core (EPC), a 5G CN, and/or one or more additional or alternative types of CNs. The components of the CN 230 may be implemented in one physical node or separate physical nodes including components to read and execute instructions from a machine-readable or computer-readable medium (e.g., a non-transitory machine-readable storage medium). In some implementations, network function virtualization (NFV) may be utilized to virtualize any or all the above-described network node roles or functions via executable instructions stored in one or more computer-readable storage mediums (described in further detail below). A logical instantiation of the CN 230 may be referred to as a network slice, and a logical instantiation of a portion of the CN 230 may be referred to as a network sub-slice. Network Function Virtualization (NFV) architectures and infrastructures may be used to virtualize one or more network functions, alternatively performed by proprietary hardware, onto physical resources comprising a combination of industry-standard server hardware, storage hardware, or switches. In other words, NFV systems may be used to execute virtual or reconfigurable implementations of one or more EPC components/functions.

As shown, CN 230, application servers 240, and external networks 250 may be connected to one another via interfaces 234, 236, and 238, which may include IP network interfaces. Application servers 240 may include one or more server devices or network elements (e.g., virtual network functions (VNFs) offering applications that use IP bearer resources with CM 230 (e.g., universal mobile telecommunications system packet services (UMTS PS) domain, LTE PS data services, etc.). Application servers 240 may also, or alternatively, be configured to support one or more communication services (e.g., voice over IP (VoIP sessions, push-to-talk (PTT) sessions, group communication sessions, social networking services, etc.) for UEs 210 via the CN 230. Similarly, external networks 250 may include one or more of a variety of networks, including the Internet, thereby providing the mobile communication network and UEs 210 of the network access to a variety of additional services, information, interconnectivity, and other network features.

Figure 3:
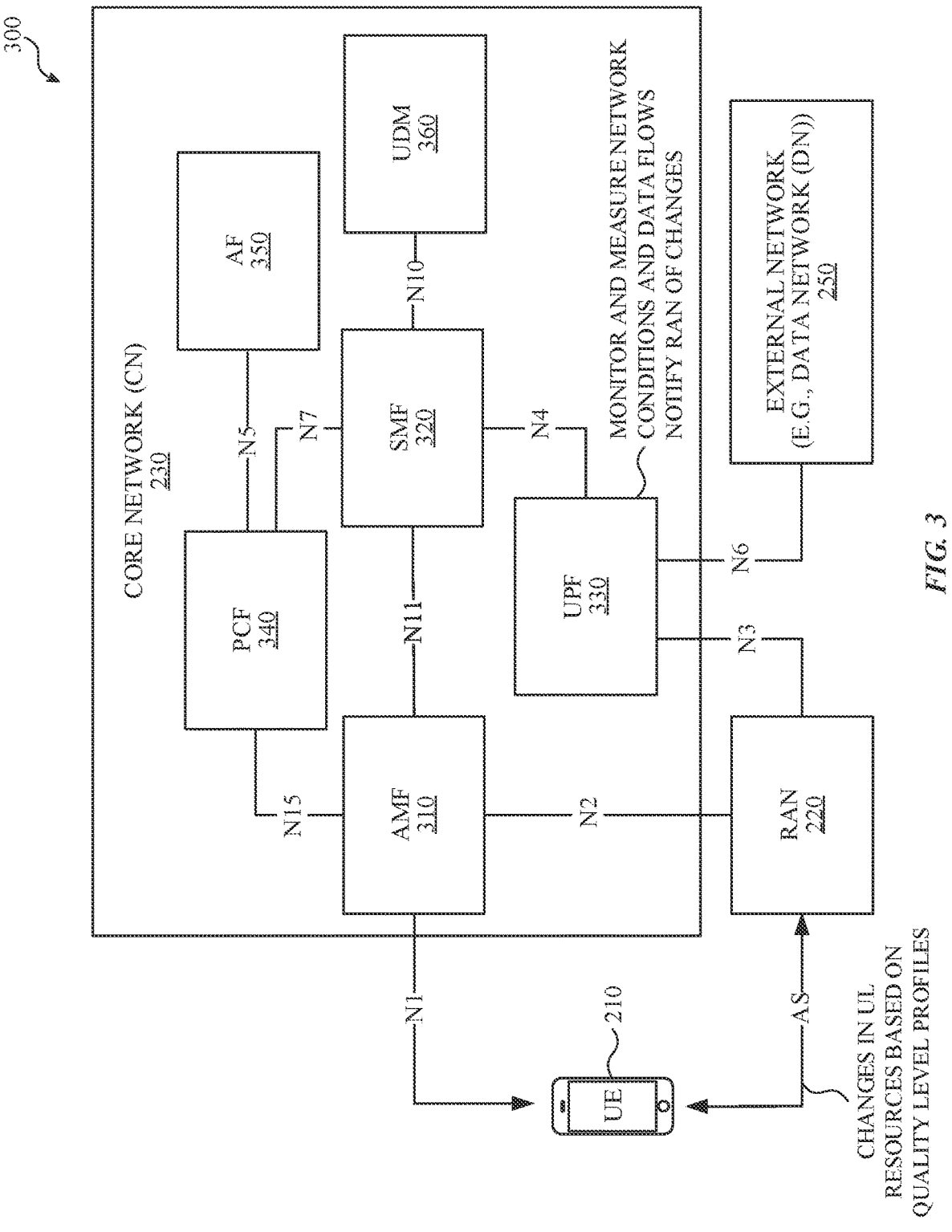
FIG. 3 is a diagram of an example core network (CN) according to one or more implementations described herein.

FIG. 3 is a diagram of an example network architecture 300 according to one or more implementations described herein. As shown, example network architecture 300 may include UE 210, RAN 220, CN 230, and external network 250. RAN 220 may include base station 222 and/or one or more other types of APs 216. CN 230 may include access and mobility management function (AMF) 310, session management function (SMF) 320, user plane function (UPF) 330), policy control function (PCF) 340, application function (AF) 350, and unified data management (UDM) node 360. AMF 310, SMF 320, UPF 330, PCF 340, AF 350, and UDM node 360 may be functions of CN 230 and may be implemented by one or more servers in a centralized or distributed networking environment, which may include one or more network virtualization functions (NVF). External network 250 may include a data network that includes one or more application servers, the Internet, another telecommunications network, and/or another type of network. In some implementations, example network architecture 300 may include one or more additional, alternative, and/or differently arranged functions, interfaces, or other features than those shown in FIG. 3.

AMF 310 may communicate with RAN 220 via an N2 interface and UE 210 via an N1 interface. AMF 310 may manage authentication, registration, and other functionalities relating to UEs 210 accessing a telecommunication mobile network. AMF 310 may handle handovers, paging, and other functionality regarding the mobility and communications of UEs 210. AMF 310 may also provide security functionality for authenticating and authorizing UEs 210. AMF 310 may communicate with SMF via an N11 interface, with PCF 340 via an N15 interface, and with UPF 340 via an N4 interface.

SMF 320 may provide PDU session management. To do so, SMF 320 may collect information related to managing a PDU session from various network components (e.g., UPF 330, PCF 340, AF 350, etc.) and control or orchestrate the network components based on a request from AMF 310. SMF 320 may be responsible for establishing, maintaining, and terminating user sessions in CN 230. SMF 320 may manage user plane (UP) resources and interact with UPF 330 to ensure that data packets are correctly routed and forwarded.

SMF 320 may receive PDU session establishment and/or session modification request from UE 210. The request may include an indication for assistance with a UL PDU set identification. The request may also indicate a real-time transport protocol (RTP) header extension and/or transport layer protocol corresponding to the requested assistance. SMF 320 may determine whether a protocol description, corresponding to the request, has been provided by PCF 340 and/or AF 350. The protocol description may include information about the RTP header extensions and/or other protocol features used by an application, and in turn, enable UE 210 to identify PDU sets from UL packets. The protocol description may also, or alternatively, include information about one or more other types of transport layer protocols and/or protocol features used by an application, such that UE 210 may identify PDU sets from UL packets based on how the application uses the transport layer protocol.

SMF 320 may include PDU set protocol descriptions, QoS profiles and parameters, quality flow identifiers (QFIs), and/or one or more additional or alternative types of information to, for example, enable UL PDU sets of a given application or service to be appropriately identified. For example, AF 350 may include protocol descriptions for different types of applications and services supported by the network, such as XR applications and/or XRM applications and services. The protocol descriptions may include information to enable UE 210, base stations 222, and other devices to identify PDU sets within a service data flow. SMF 320 may receive the protocol descriptions from AF 350 via PCF 340, and may provide the protocol descriptions to UE 210, RAN 220, UPF 330, and/or one or more of the devices or entities described herein. In some implementations, the protocol descriptions provided by SMF 320 may be based, at least in part, on rules received from PCF 340.

UPF 330 may communicate with RAN 220 via an N3 interface, PCF 340 via an N7 interface, and SMF 320 via an N11 interface, which may be routed through RAN 220. UPF 330 may operate as a point of connection for PDU sessions between RAN 220 and external data network 250 (e.g., the Internet, another telecommunication network, etc.) via interface N6. UPF 330 may also provide support for packet routing, forwarding, and inspection. UPF 330 may provide for user plane rule enforcement, QoS handling, UL/DL rate enforcement, and service data flow (SDF) to QoS flow mapping. UPF 330 may communicate with SMF 320 via an N4 interface and with RAN 220 via an N3 interface.

UPF 330 (and/or another function of CN 230 or RAN 220) may monitor and measure a network load, link quality, data flow quality, and/or another type of characteristic relating to the service quality of a data flow associated with UE 210 and RAN 220. UPF 330 and/or another function of CN 230 or RAN 220 may compare the monitored conditions and measurements to one or more types of network service thresholds and may inform RAN 220 (e.g., base station 222) when the monitored conditions and measurements exceeds a corresponding threshold. As described herein, this may cause or prompt RAN 220 to RAN 220 to switch from a CG associated with one quality level (e.g., quality level X) to a CG associated with another quality level (e.g., quality level Y).

PCF 340 may provide policy control and flow-based control functionalities. PCF 340 may include and provide policy charging and control (PCC) rules for applications, data flows, PDU sets, gating, QoS, etc., to SMF 320. PCF 340 may also provide access and mobility management policies to AMF 310. PCF 340 may communicate with SMF 320 via an N7 interface and with AMF 310 via an N15 interface.

UE 210 may send and receive information from RAN 220 via an access stratum (AS) interface. UE 210 may also send and receive PDU set information (e.g., protocol descriptions for PDU set information) from SMF 320. QoS flow profiles and PDU set protocol descriptions may also be configured from SMF 320 to RAN 220 and UE 210. Each QoS flow profile and/or PDU set protocol description may be associated with a set of QoS parameters that may be part of a QoS profile stored by RAN 220 and updated by AMF 310. Examples of QoS parameters may include a resource type, packet delay budget (PDB), quality flow identifier (QFI), packet error rate (PER), averaging window, and more. AMF 310 may provide UE 210 with QoS rules during a PDU session via a non-access stratum (NAS) protocol or interface.

AF 350 may include a network function configured to manage traffic and QoS assignments, through interaction with the policy elements. AF 350 may expose an application layer for interaction with 5G network functions (NFs) and network resources. AF 350 may reside in a control plane of a 5G service-based architecture (SBA), and AF 350 may function to access a network repository function (NEF) for retrieving resources, interacting with PCF 340 via an N5 interface, enabling policy control, traffic routing for applications, and providing application services to subscribers.

UDM node 360 may handle subscription-related information to support the handling of communication sessions. UDM node 360 may store subscription data of UE 210, which may be communicated between the UDM node 360 and the AMF 310 via an N8 interface (not shown). UDM node 360 may communicate with SFM 320 via an N10 interface. UDM node 360 may include two parts, an application functional entity (FE) and a unified data repository (UDR). The UDR may store subscription data and policy data for UDM node 360 and PCF 340, and/or structured data for exposure and application data (including packet flow descriptions (PFDs) for application detection and requested information). UDM node 360 may include a UDM-FE, which may process credentials, perform location management, subscription management, and so on. The UDM-FE may also access subscription information stored in the UDR and perform authentication credential processing, user identification handling, access authorization, registration/mobility management, and subscription management.

Figure 4:
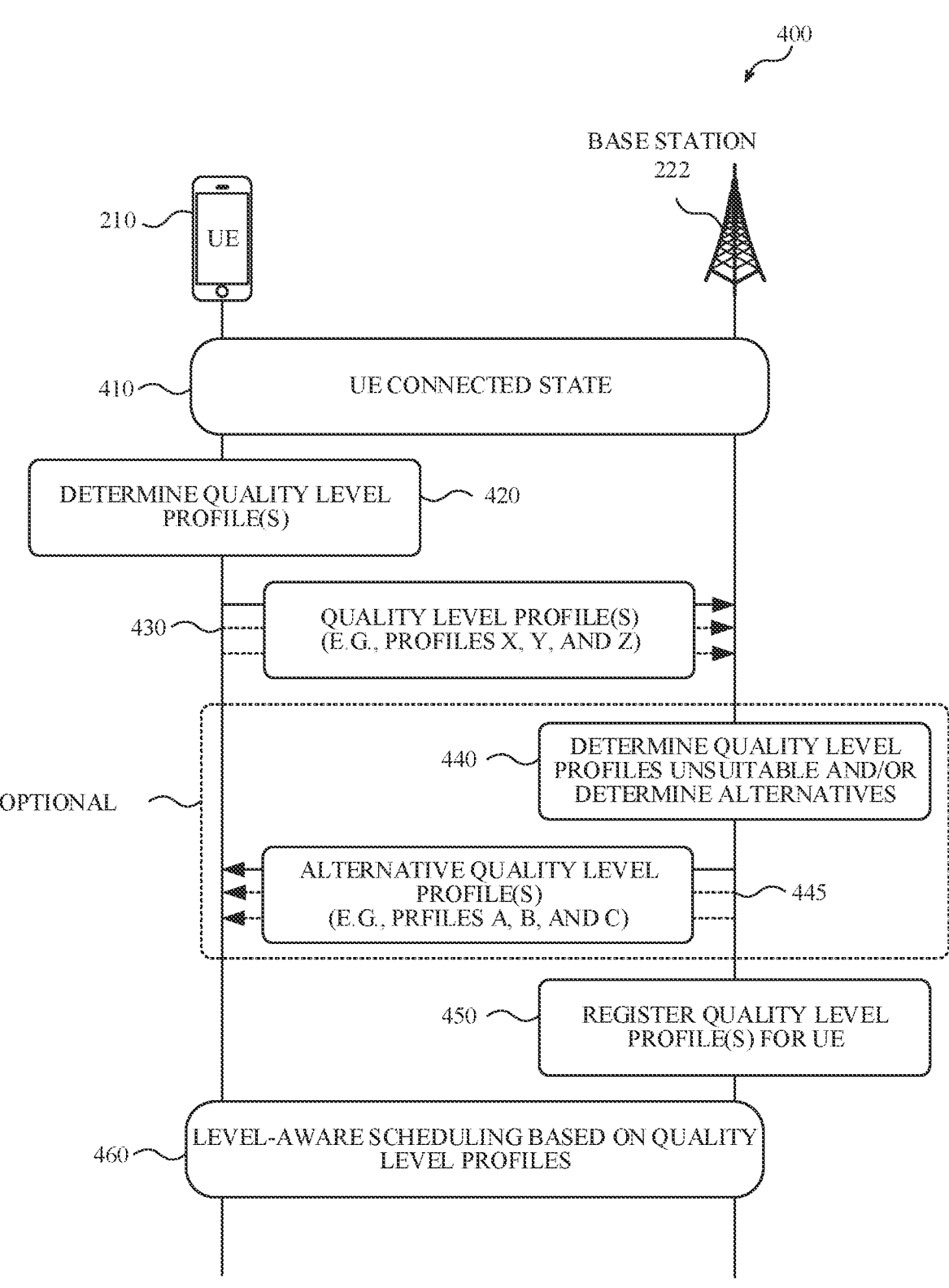
FIG. 4 is a diagram of an example process of UE-indicated, level-based network service quality according to one or more implementations described herein.

FIG. 4 is a diagram of an example process 400 of UE-indicated, level-based network service quality according to one or more implementations described herein. Process 400 may be implemented by UE 210 and one or more base stations 222. In some implementations, some or all of process 400 may be performed by one or more other systems or devices, including one or more of the devices of FIG. 2. Additionally, process 400 may include one or more fewer, additional, differently ordered and/or arranged operations than those shown in FIG. 4. In some implementations, some or all of the operations of process 400 may be performed independently, successively, simultaneously, etc., of one or more of the other operations of process 400. As such, the techniques described herein are not limited to a number, sequence, arrangement, timing, etc., of the operations or processes depicted in FIG. 4. FIG. 4 is described below with periodic reference to FIGS. 5-8.

As shown, process 400 may include UE 210 being connected to base station 222 (block 410). For example, UE 210 may discover and establish a wireless connection with base station 222. This may involve UE 210 communicating with base station 222 to complete an attachment procedure. The UE connected state may include a radio resource control (RRC) connected state.

Process 400 may include UE 210 determining one or more quality level profiles (block 420). One or more of the quality level profiles may be predetermined and stored locally by UE 210. Additionally, or alternatively, one or more of the quality level parameters may be dynamically determined by UE 210. For example, a quality level profile may be determined based on a wireless communication standard implemented by UE 210, based on a UE type of UE 210, based on a hardware configuration of UE 210, or based on an application or network service being accessed by UE 210. For example, a set of quality level profiles for one type of application, network service, or data flow may be different than a set of quality level profiles for another type of application, network service, or data flow. In some implementations, a quality level profile may also, or alternatively, be determined based on a historical, current, and/or forecasted network condition measured by UE 210 and/or indicated by base station 222.

FIG. 5 is a diagram of an example data structure 500 for quality level profiles according to one or more implementations described herein. While example data structure 500 includes a number, types, and arrangements of quality level profiles and profile attributes, the techniques described herein may include a fewer, more, additional, and/or an alternative number, type, and arrangement of quality level profiles and/or profile attributes. As shown, data structure 500 may quality level profiles and corresponding profile attributes. The quality level profiles may include quality level profile X, quality level profile Y, and quality level profile Z. Quality level profile X may correspond to a lower level of network service. Quality level profile Y may correspond to a medium level of network service. Quality level profile Z may correspond to a higher level of network service.

Each quality level profile may be characterized by profile attributes logically associated therewith. Quality level profile X may include a burst size of size_X, a burst cadence of cadence_X, and a delay budget of budget_X; quality level profile Y may include a burst size of size_Y, a burst cadence of cadence_Y, and a delay budget of budget_Y; and quality level profile Z may include a burst size of size_Z, a burst cadence of cadence_Z, and a delay budget of budget_Z. The profile attributes may describe a level of network service or QoS, and may correspond to an application, network service, type of data flow, etc.

A burst size may include a number of bytes associated with a packet burst size of a UL transmission. A burst cadence may include a periodicity of aforementioned packet burst and a number of transmission repetitions defining the overall traffic pattern that UE 210 may apply to UL. A delay budget may be a packet delay budget (PDB) and may refer to a packet transmission delay from UE 210 to a device, network function, or other specified entity (e.g., base station 222, UPF 330, an application server, another UE, etc.). Additional examples of profile attributes may include a jitter or a packet delay variation (PDV), a GFBR, an MFBR, an MPLR, a bit rate, an end-to-end (E2E) link capacity, and more.

Referring to FIG. 4, process 400 may include UE 210 communicating quality level profiles to base station 222 (block 430). This may be done in one or multiple UL transmissions. In some implementations, UE 210 may communicate quality level profiles in one or more ways, such as via MAC CE, a buffer status report, a periodic cadence report (PCR), an RRC message, NAS signaling, or another type of signaling mechanism or message.

Figure 6:
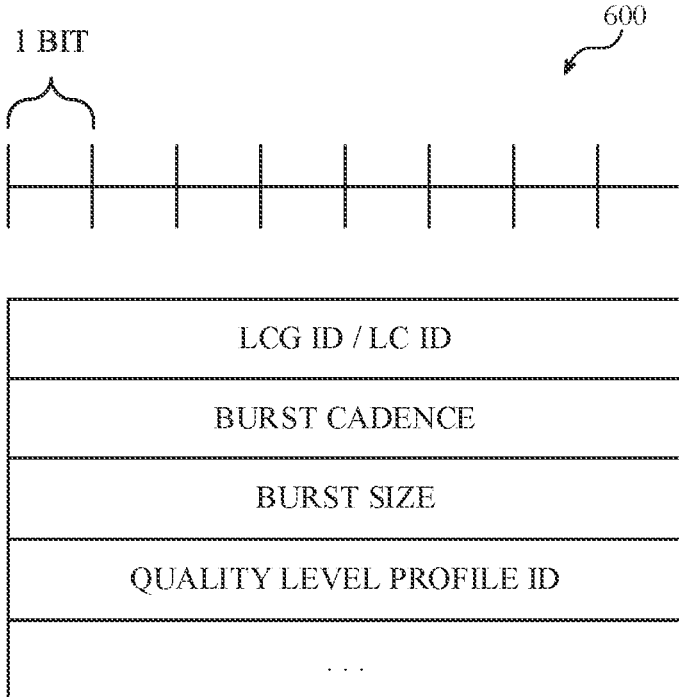
FIGS. 6-8 are diagrams of examples of data structures for indicating quality level profiles according to one or more implementations described herein.
Figure 7:
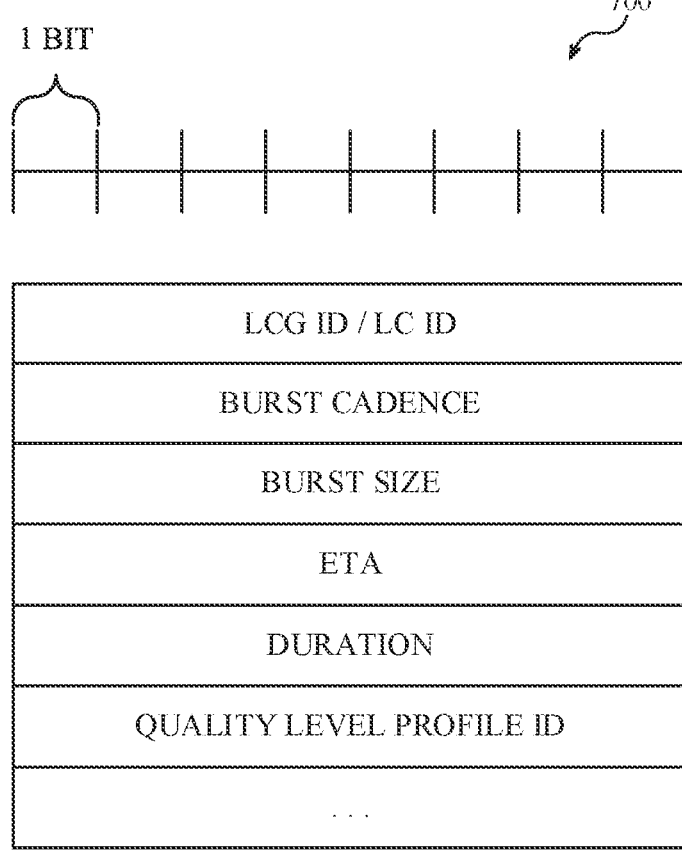
Figure 8:
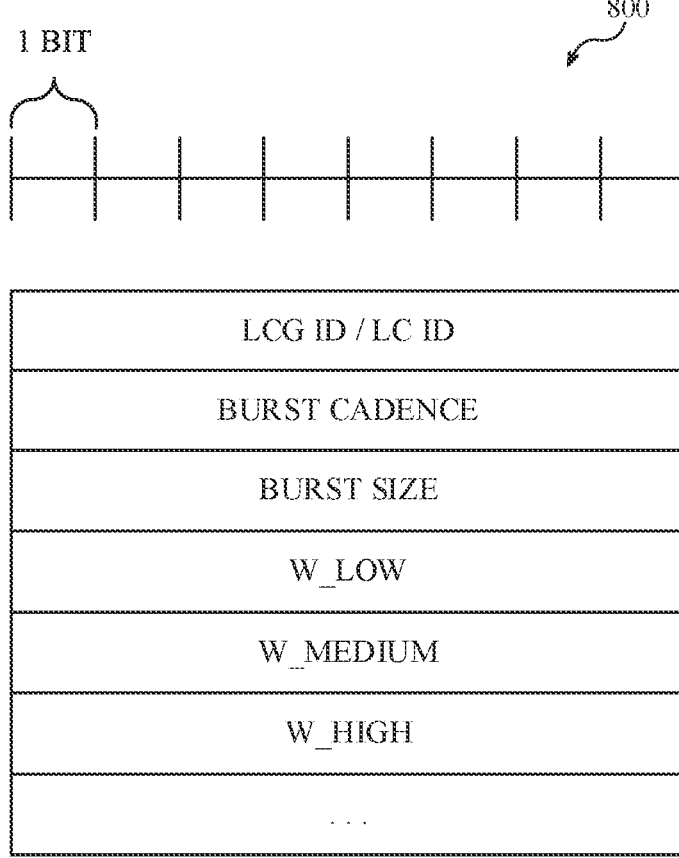

FIGS. 6-8 are diagrams of examples of data structures 600-800 for indicating quality level profiles according to one or more implementations described herein. While example data structures 600-800 each include a number, types, and arrangements of quality level profiles and profile attributes, the techniques described herein may include a fewer, more, additional, and/or an alternative number, type, and arrangement of quality level profiles and/or profile attributes. Data structures 600-800 may be examples of information contained in a MAC CE, BSR, PCR, and/or other type of message or signaling mechanism.

Data structures 600-800 may also, or alternatively, be examples of (or part of) a BSR or PCR. UE 210 may be configured to periodically generate and communicate a BSR to base station 222. The BSR may indicate UE-known characteristics such as a packet burst cadence, UL traffic pattern information, application information, and more. In some implementation, one or more of data structures 600-800 may be eight bits in size. In some implementations, each attribute of data structures 600-800 may be up to eight bits in size or occupy an eight-bit field. In some implementations, one or more of data structures 600-800 and/or one or more of the attributes of data structures 600-800 may be larger or smaller than eight bits.

Data structure 600 may include a logical channel (LC) identifier (ID) and/or a LC group (LCG) ID. This many enable a receiving device (e.g., base station 222) to determine a logical channel that corresponds to the corresponding quality level profile. Data structure 600 may also include a burst cadence and burst size, which are described above with reference to FIG. 5. Data structure 600 may also include a quality level profile ID to identify the corresponding quality level profile. In some implementations, data structure 600 may be a BSR MAC CE with explicit data flow pattern information and additional characteristics, enhanced with a quality level profile ID. In some implementations, one data structure may be used to indicate one quality level profile, and each quality level profile of a set of quality level profiles may be associated by, for example, a common logical channel (LC) identifier (ID), LCG ID, and/or another type of identifier field.

Data structure 700 may include a LC ID and/or LCG ID. This many enable a receiving device (e.g., base station 222)

to determine a logical channel that corresponds to the corresponding quality level profile. Data structure 700 may also include a burst cadence and burst size, which are described above with reference to FIG. 5. Data structure 700 may also include an expected time of arrival (ETA) and duration of a data burst. An ETA may include a relative of absolute time reference when a data burst is expected to be ready for transmission. A duration may be an amount of time or a window of time during which the data burst is ready for transmission relative to the ETA. Data structure 700 may also include a quality level profile ID to identify the corresponding quality level profile. As such, data structure 600 may be a BSR MAC CE with explicit data flow pattern information and additional characteristics, enhanced with a quality level profile ID. In some implementations, one data structure may be used to indicate one quality level profile, and each quality level profile of a set of quality level profiles may be associated by, for example, a common logical channel (LC) identifier (ID), LCG ID, and/or another type of identifier field.

Data structure 800 may include LC ID and/or LCG ID. This many enable a receiving device (e.g., base station 222) to determine a logical channel that corresponds to the corresponding quality level profile. Data structure 800 may also include a burst cadence and burst size, which are described above with reference to FIG. 5. Data structure 800 may also include one or more weighted factors (e.g., W_LOW, W_MEDIUM, and W_HIGH). Each weighted factor may enable the receiving device (e.g., base station 222) to determine the change in a characteristic for different quality level profiles. For example, base station 222.

W_LOW may be 1; W_MEDIUM may be 1.5; and W_HIGH may be 3. As such, base station 222 may determine a packet burst size for a low, medium, and high-quality level profile by applying the indicated packet burst size to the corresponding weighted value. Thus, assume that the burst size explicitly indicated by data structure 800 is 1,000 bytes, base station 222 may determine that a burst size for quality level profile X is 1,000 bytes, a burst size for quality level profile Y is 1,500 bytes, and a burst size for quality level profile Z is 3,000 bytes. Data structure 800 may be a BSR MAC CE with explicit data flow pattern information and weighted factors for multiple quality level profiles. In contrast to data structures 600 and 700, data structure 800 may not include an explicit quality level profile ID.

Referring to FIG. 4, process 400 may include base station 222 determining that quality level profiles from UE 210 are unsuitable and determining alternative quality level profiles (block 440). Base station 222 may receive quality level profiles from UE 210. The quality level profiles may each include a set of parameters defining, or otherwise consistent with, different levels of QoS (e.g., packet size, packet rate, burst size, delay budget, etc.). The quality level profiles may be based on an application or network service being accessed by UE 210. Base station 222 may evaluate the quality level profiles to determine whether to accept the quality level profiles. Base station 222 may evaluate the quality level profiles based on characteristics of the quality level profiles and current network conditions and capabilities. For example, base station 222 may verify whether base station 222 and/or CN 230 (not shown) are able to support the quality level profiles. This may include the base station 222 measuring or otherwise determining a level of congestion or signal interference at base state 222, a measured network load of CN 230, a link quality or throughput associated with UPF 330, an application type, a network service, a subscription or profile associated with UE 210, etc.

When base station 222 determines that the quality level profiles may not be supported, base station 222 may generate or determine an alternative set of quality level profiles (block 440). Base station 222 may determine the number and arrangement of the alternative quality level profiles, and/or the attributes and values thereof, based on levels of QoS that base station 222 determines may be supported by current network conditions. In some implementations, the alternative quality level profiles may include a same or similar number and arrangement of quality level profiles as the quality level profiles received from UE 210. For example, if the quality level profiles received from UE 210 included three quality level profiles (e.g., profiles X, Y, and Z) arranged as a low-quality profile, medium-quality profile, and high-quality profile, the alternative quality level profiles determined by base station 222 may also include three quality level profiles (e.g., profiles A, B, and C) that are also arranged as a low-quality profile, medium-quality profile, and high-quality profile.

Additionally, or alternatively, the alternative quality level profiles may include the same, or a similar, number and arrangement of characteristics as the quality level profiles received from UE 210; however, the values of one or more of the characteristics of the alternative quality level profiles may be different. For example, when the quality level profiles received from UE 210 include an LC ID, LCG ID, burst cadence, burst size, and quality level profile ID, the values for the LC ID, LCG ID, and/or quality level profile ID may be the same for the alternative quality level profiles, but the values for the burst cadence and/or burst size may be different. Alternatively, the attributes and corresponding values of the alternative quality level profiles generated by base station 222 may be completely different than the attributes and/or corresponding values of the quality level profiles received from UE 210.

Upon determine the alternative quality level profiles (block 440), base station 222 may communicate the alternative quality level profiles to UE 210 (block 445). Base station 222 may communicate the alternative quality level profiles as part of a UL grant, as DCI, via one or more DL MAC CE, RRC messages, NAS signaling, etc. The data structures used to communicate the alternative quality level profiles may be similar to one or more of the data structures of FIGS. 6-8. UE 210 may receive and use the alternative quality level profiles for level-aware scheduling based on the quality level profiles.

When base station 222 determines that the quality level profiles received from UE 210 are valid or determines alternative quality level profiles (block 440), process 400 may proceed by base station 222 registering the quality level profiles for the UE 210 (block 450). In some implementations, base station 222 may register the quality level profiles received from UE 210 without determining whether the quality level profiles are valid. Base station 222 may register the quality level profiles for UE 210 by storing the quality level profiles and determining which quality level profile is suitable for current network conditions.

Determining which quality level profile is suitable for current conditions may enable base station 222 to later determine when a different quality level profile should be implemented. As UE 210 and base station 222 may both be aware of the quality level profiles applicable to a particular application, network service, or data flow, UE 210 and base station 222 may engage in level-aware scheduling based on the quality level profiles (block 460). This may include enhanced procedures for adjusting UL resource usage and schedule that is more efficient and response that currently available techniques such as a UL grant, SR, etc. Examples and details of level-aware scheduling based on the quality level profiles are discussed be below with reference to the Figures below.

Figure 9:
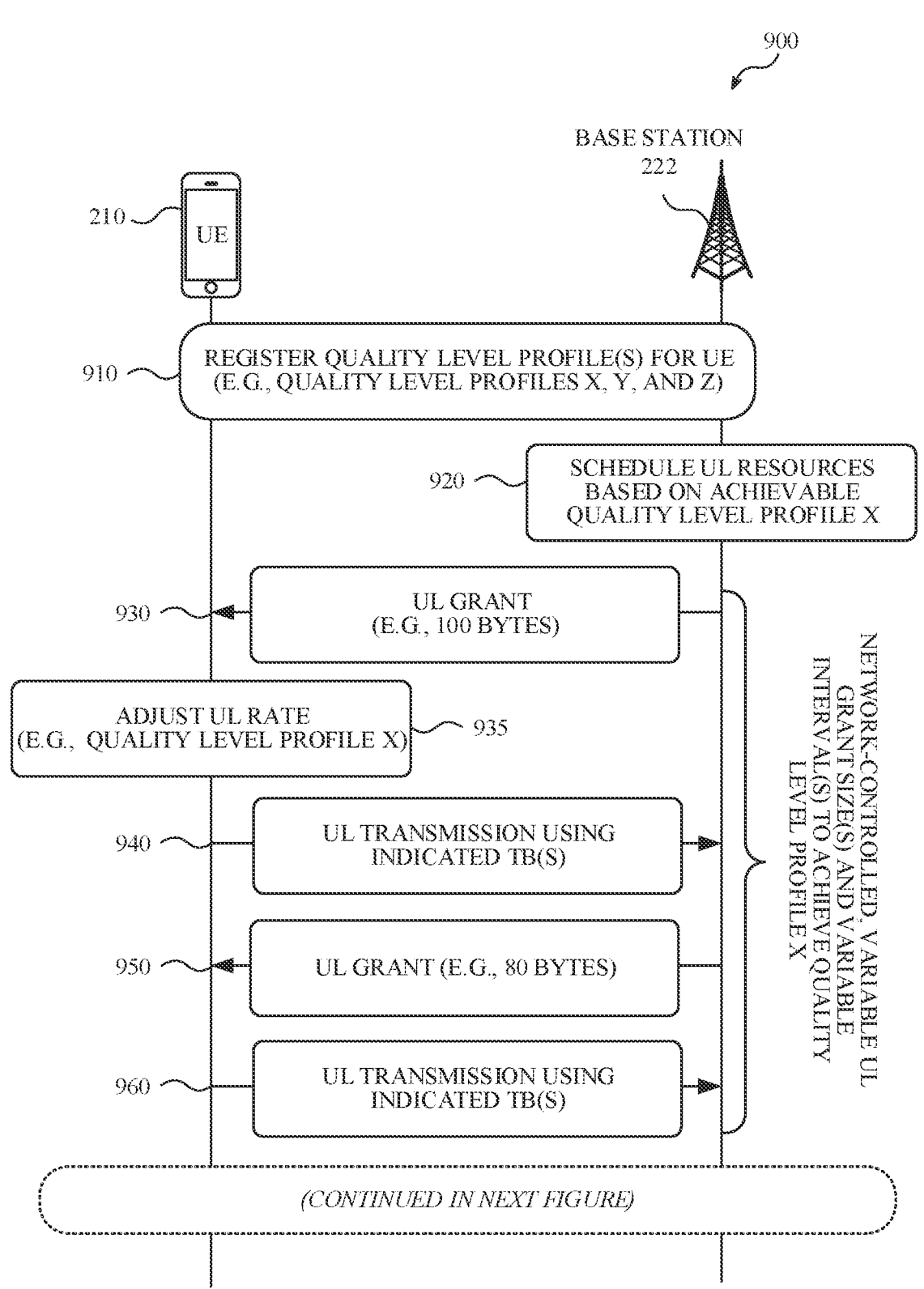
FIGS. 9-10 are diagrams of an example process for level-based network service scheduling within indications according to one or more implementations described herein.
Figure 10:
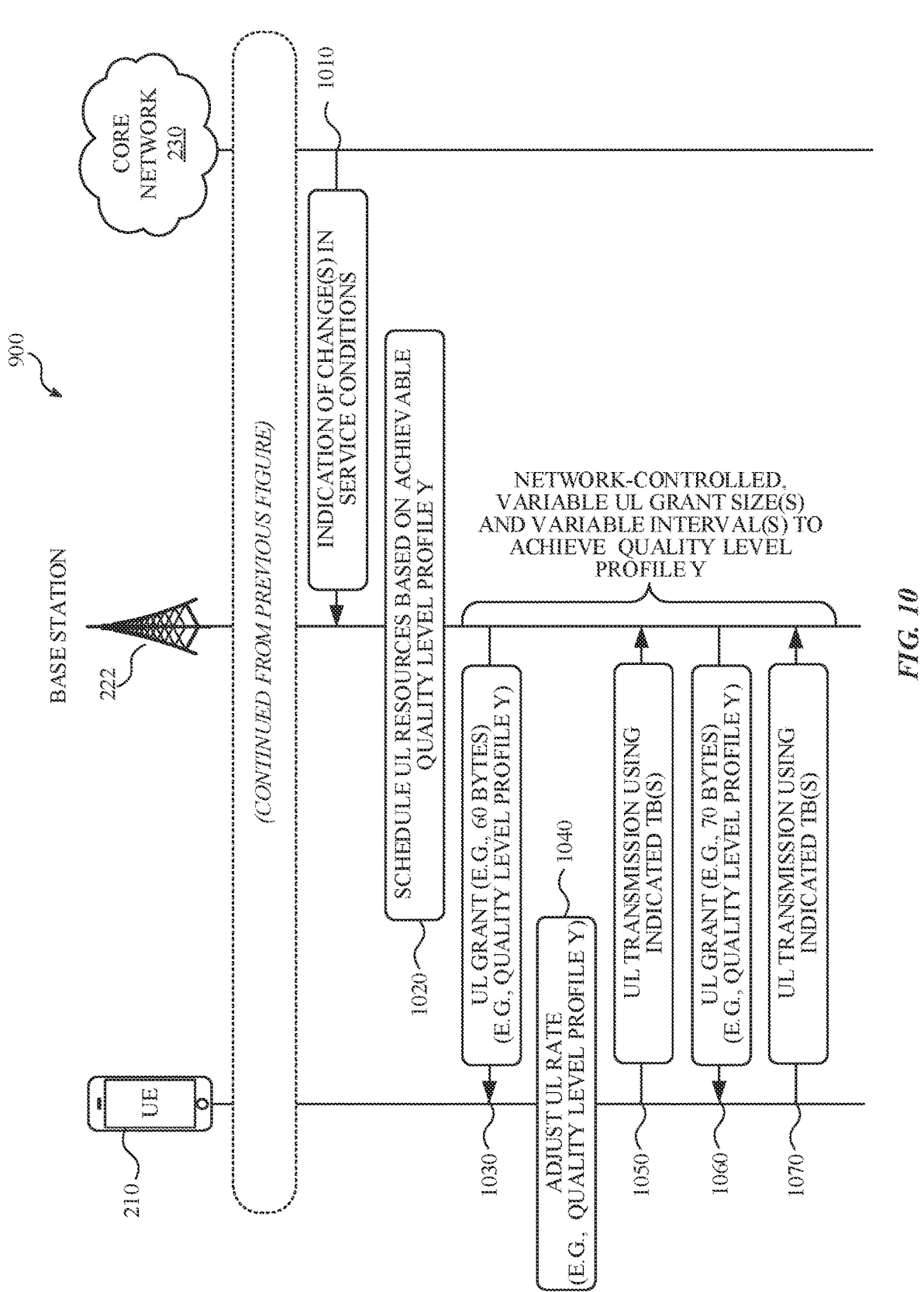

FIGS. 9-10 are diagrams of an example process 900 for level-based network service quality scheduling via indications according to one or more implementations described herein. Process 900 may be implemented by UE 210, one or more base stations 222, and CN 230. In some implementations, some or all of process 900 may be performed by one or more other systems or devices, including one or more of the devices of FIGS. 2-3. Additionally, process 900 may include one or more fewer, additional, differently ordered and/or arranged operations than those shown in FIGS. 9-10. In some implementations, some or all of the operations of process 900 may be performed independently, successively, simultaneously, etc., of one or more of the other operations of process 900. As such, the techniques described herein are not limited to a number, sequence, arrangement, timing, etc., of the operations or processes depicted in FIGS. 9-10.

As shown, process 900 may include UE 210 and base station 222 registering quality level profiles for UE 210 (block 910). The quality level profiles may correspond to an application, network service, data flow, LCH, etc. The quality level profiles may be generated by UE 210 or base station 222. Process 900 may also include base station 222 scheduling UL resources based on an achievable quality level (block 920). For example, base station 222 may monitor and measure network conditions and determine which of the quality level profiles is most suitable. For purposes of explaining process 900, assume that base station 222 determines that quality level profile X is the most suitable.

Process 900 may include base station 222 generating and communicating a UL grant to UE 210 (block 930). The UL grant may indicate characteristics of UL transmissions, such as a transport block (TB) size (TBS) of 100 bytes associated with the UL grant. The UL resources indicated by the UL grant may be consistent with the quality level profile (quality level profile X) selected by base station 222, such that UE 210 may be able to infer which quality level profile is currently supported by the network.

In some implementations, base station 222 may also, or alternatively, explicitly indicate the quality level profile supported using DCI associated with a UL grant, using one or more DL MAC CEs, or in one or more other messages or signaling techniques. Base station 222 may also indicate one or more additional, or alternative, characteristics relating to the supported quality level profile, such as an ETA, a duration, a validity time or window, etc.

Process 900 may include UE 210 receiving the UL grant and adjusting a UL rate according to the currently supported quality level profile (e.g., quality level profile Y) (block 935). A UL rate may include a GFBR for a particular network service, application, or data flow. In such a scenario, the GRBR may be between a minimum GFBR and a maximum GFBR (or MFBR). UE 210 may notify a transport layer and/or application layer of the quality level supported, which may cause or enable the transport layer and/or application layer to adjust a packet rate, packet size, etc., to be consistent with the quality level profile supported. As such, data produced by the application may be based on an indicated level of quality supported as opposed to an estimated level of quality supported.

Process 900 may include UE 210 communicating with base station 222 via one or more UL TBs (block 940). The UL transport blocks may be based on the UL grant, quality level profile, and/or UL resources indicated by base station 222. The UL transmission may involve the application, network service, data flow, LCH, etc., corresponding to the service quality profiles, UL grant, etc.

Process 900 may include base station 222 generating and communicating another UL grant to UE 210 (block 950). Base station 222 may generate the UL grant based on network conditions, application preferences, and/or one or more other factors periodically monitored, measured, and evaluated by base station 222. Prior to generating the UL grant, base station 222 may determine that the previously selected quality level profile is still suitable for network conditions. Similar to the prior UL grant, the UL grant may indicate characteristics of UL transmissions, such as a TBS of 80 bytes associated with the UL grant. The UL resources indicated by the UL grant may be consistent with the quality level profile (quality level profile X) selected by base station 222, such that UE 210 may be able to infer which quality level profile is currently supported by the network.

As described above with reference to block 930, base station 222 may also, or alternatively, explicitly indicate the quality level profile supported using DCI associated with a UL grant, using one or more DL MAC CEs, or in one or more other messages or signaling techniques. Base station 222 may also indicate one or more additional, or alternative, characteristics relating to the supported quality level profile, such as an ETA, a duration, a validity time or window, etc. The ETA may also, or alternatively, be reported by UE 210 to base station 222. UE 210 may receive the UL grant, notify a transport layer and/or application layer of the quality level supported, which may cause or enable the transport layer and/or application layer to adjust a packet rate, packet size, etc., to be consistent with the quality level profile supported. As such, data produced by the application may be based on an indicated level of quality supported as opposed to an estimated level of quality supported.

Process 900 may include UE 210 communicating with base station 222 via one or more UL TBs (block 960). The UL transport blocks may be based on the UL grant, quality level profile, and/or UL resources indicated by base station 222. The UL transmission may involve the application, network service, data flow, LCH, etc., corresponding to the service quality profiles, UL grant, etc. Accordingly, process 900 may include network-control and variable UL grant sizes and intervals to achieve or support a selected quality level profile (e.g., quality level profile X) (blocks 930-960).

Referring to FIG. 10, process 900 may also include base station 222 receiving an indication of a change in service conditions from CN 230 (block 1010). For example, CN 230 may communicate information to base station 222 about changes in an ability of CN 230 to continue supporting an application or network service at a given level of service (e.g., at a QoS). This may include an indication of a level of network congestion within CN 230, a change in a link or data flow associated with UE 210, etc. For example, UPF 330 may measure and monitor a bit rate, data throughput, latency, delay, packet loss, etc., relative to a particular data flow. UPF 330 may compare these characteristics to one or more thresholds to determine whether there has been a meaningful change in an ability of CN 230 to support an application or network service at a given QoS. Upon determining that a meaningful change has occurred, UPF 330 may provide information to base station 222 indicating the change. In some implementations, one or more additional or alternative CN functions may be involved. Additionally, or alternatively, a device or entity outside of CN 230 (e.g., another UE, an application server, etc.) may provide this functionality.

Process 900 may also include base station 222 scheduling UL resources based on an achievable quality level (block 1020). For example, base station 222 may monitor and measure network conditions and determine which of the quality level profiles is most suitable. This may include base station 222 evaluating information about changes in service conditions from CN 230. For purposes of explaining process 900, assume that base station 222 determines that quality level profile Y is now more suitable than quality level profile X.

Process 900 may include base station 222 generating and communicating a UL grant to UE 210 (block 1030). The UL grant may indicate characteristics of UL transmissions, such as a TBS (e.g., of 60 bytes) associated with the UL grant. The UL resources indicated by the UL grant may be consistent with the quality level profile (quality level profile Y) selected by base station 222, such that UE 210 may be able to infer which quality level profile is currently supported by the network. In some implementations, base station 222 may also, or alternatively, explicitly indicate the quality level profile supported using DCI associated with a UL grant, using one or more DL MAC CEs, or in one or more other messages or signaling techniques. Base station 222 may also indicate one or more additional, or alternative, characteristics relating to the supported quality level profile, such as an ETA, a duration, a validity time or window, etc.

Process 900 may include UE 210 receiving the UL grant and adjusting a UL rate according to the currently supported quality level profile (e.g., quality level profile Y) (block 1040). UE 210 may notify a transport layer and/or application layer of the quality level supported, which may cause or enable the transport layer and/or application layer to adjust a packet rate, packet size, etc., to be consistent with the quality level profile supported. As such, data produced by the application may be based on an indicated level of quality supported as opposed to an estimated level of quality supported.

Process 900 may include UE 210 communicating with base station 222 via one or more UL TBs (block 1050). The UL TBs may be based on the UL grant, quality level profile, and/or UL resources (e.g., 60 bytes) indicated by base station 222. The UL transmission may involve the application, network service, data flow, LCH, etc., corresponding to the service quality profiles, UL grant, etc.

Process 900 may include base station 222 generating and communicating another UL grant to UE 210 (block 1060). Base station 222 may generate the UL grant based on network conditions, application preferences, and/or one or more other factors periodically monitored, measured, and evaluated by base station 222. Prior to generating the UL grant, base station 222 may determine that the previously selected quality level profile is still suitable for network conditions. Similar to the prior UL grant, the new UL grant may indicate UL resources (e.g., a TBS of 80 bytes) associated with the UL grant. The UL resources indicated by the UL grant may be consistent with the quality level profile (quality level profile y) selected by base station 222, such that UE 210 may be able to infer which quality level profile is currently supported by the network.

Process 900 may include UE 210 communicating with base station 222 via one or more UL TBs (block 1070). The UL transport blocks may be based on the UL grant, quality level profile, and/or UL resources indicated by base station

222. The UL transmission may involve the application, network service, data flow, LCH, etc., corresponding to the service quality profiles, UL grant, etc. Accordingly, process 900 may include network-control and variable UL grant sizes and intervals to achieve or support a selected quality level profile (e.g., quality level profile 6) (blocks 1030-1070).

Figure 11:
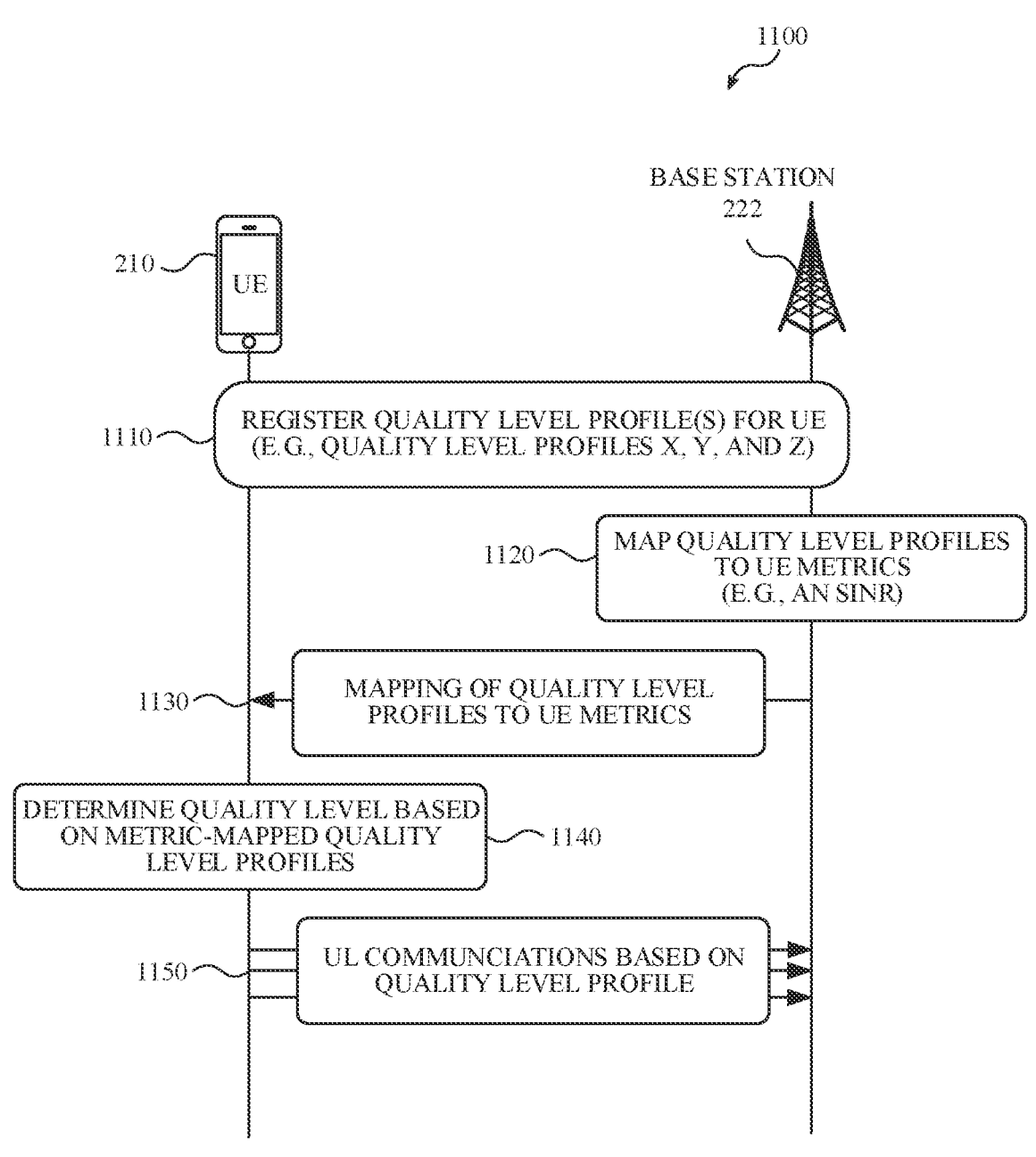
FIG. 11 is a diagram of an example process for mapping quality levels to UE metrics according to one or more implementations described herein.

FIG. 11 is a diagram of an example process 1100 for mapping quality levels to UE metrics according to one or more implementations described herein. Process 1100 may be implemented by UE 210 and one or more base stations 222. In some implementations, some or all of process 1100 may be performed by one or more other systems or devices, including one or more of the devices of FIG. 2. Additionally, process 1100 may include one or more fewer, additional, differently ordered and/or arranged operations than those shown in FIG. 11. In some implementations, some or all of the operations of process 1100 may be performed independently, successively, simultaneously, etc., of one or more of the other operations of process 1100. As such, the techniques described herein are not limited to a number, sequence, arrangement, timing, etc., of the operations or processes depicted in FIG. 11.

As shown, process 1100 may include UE 210 and base station 222 registering quality level profiles for UE 210 (block 1110). UE 210 may generate two or more quality level profiles associated with an application, network service, data flow, LCH, etc. UE 210 may store a local copy of the quality level profiles and communicate another copy of the quality level profiles to base station 222. Base station 1120 may store the quality level profiles, such that UE 210 and base station 222 may have copies of the quality level profiles. In some implementations, UE 210 may communicate the quality level profiles to base station as part of a BSR, an SR procedure, as a MAC CE, an RRC message or information element (IE), or as part of NAS signaling.

Process 1100 may include base station 222 mapping UE metrics to the quality level profiles from UE 210 (block 1120). For example, base station 222 may map UE metrics to the quality level profiles by creating a logically association between each quality level profile and one or more UE metrics. A UE metric may include a type, level, or degree of a particular network condition, signal strength, QoS, throughput, delay, bitrate, etc. A UE metric may also, or alternatively, include a signal interference noise ratio (SINR), reference signal received power (RSRP), reference signal received quality (RSRQ), a resource location, slot, or subframe number(s) of scheduling, cell ID(s), a number of component carriers (CCs) being activated, and/or one or more other features or conditions that UE 210 may monitoring, measuring, determining, or detect.

In one example, base station 222 may map each quality level profiles to an SINR. A higher performance quality level profile may be mapped to a lower SINR relative to the SINR mapped to a lower performance quality level profile. An increase or decrease in network load at base station 222 and/or CN 230 often coincides with an similar increase or decrease in SINR at UE 210. As a result, since base station 222 has provided UE 210 with a mapping of quality level profiles to SINR values, UE 210 may infer which quality level profile is currently supported based on the SINR, thereby alleviating the network from an explicit communication to UE 210 about a quality level profile change.

Process 1100 may include base station 222 communicating a data set representing the mapping of the quality level profiles to the UE metrics (block 1130). Base station 222 may provide the mapping of the quality level profiles to the UE metrics using RRC signaling, a MAC CE, DCI, L1 control information, or another type of message or signaling.

Process 1100 may include UE 210 determining a quality level based on metric-mapped quality level profiles (block 1140). For example, UE 210 may measure an SINR (and/or another type of UE metric or condition) and determine which quality level profile corresponds to the SINR. Process 1100 may also include UE 210 transmitting UL communications to base station 222 based on the quality level profile (block 1150).

While not shown, UE 210 may continuously or periodically measure the SINR (and/or other type of UE metric or condition) and compare the measured SINR to the quality level profiles. In response to determining that a newly measured SINR corresponds to a different quality level profile, UE 210 may switch from communicating with base station 222 using the current quality level profile to communicating with base station 222 using the quality level profile mapped to the newly measured SINR. In this manner, UE 210 may infer the quality level profile currently supported by base station 222, and thus not wait for an explicit indication from base station 222 (e.g., via UL grant or the like). An additional example and details for using quality level profiles that are mapped to UE metrics for level-based network service quality changes is discussed below with reference to the following Figures.

Figure 12:
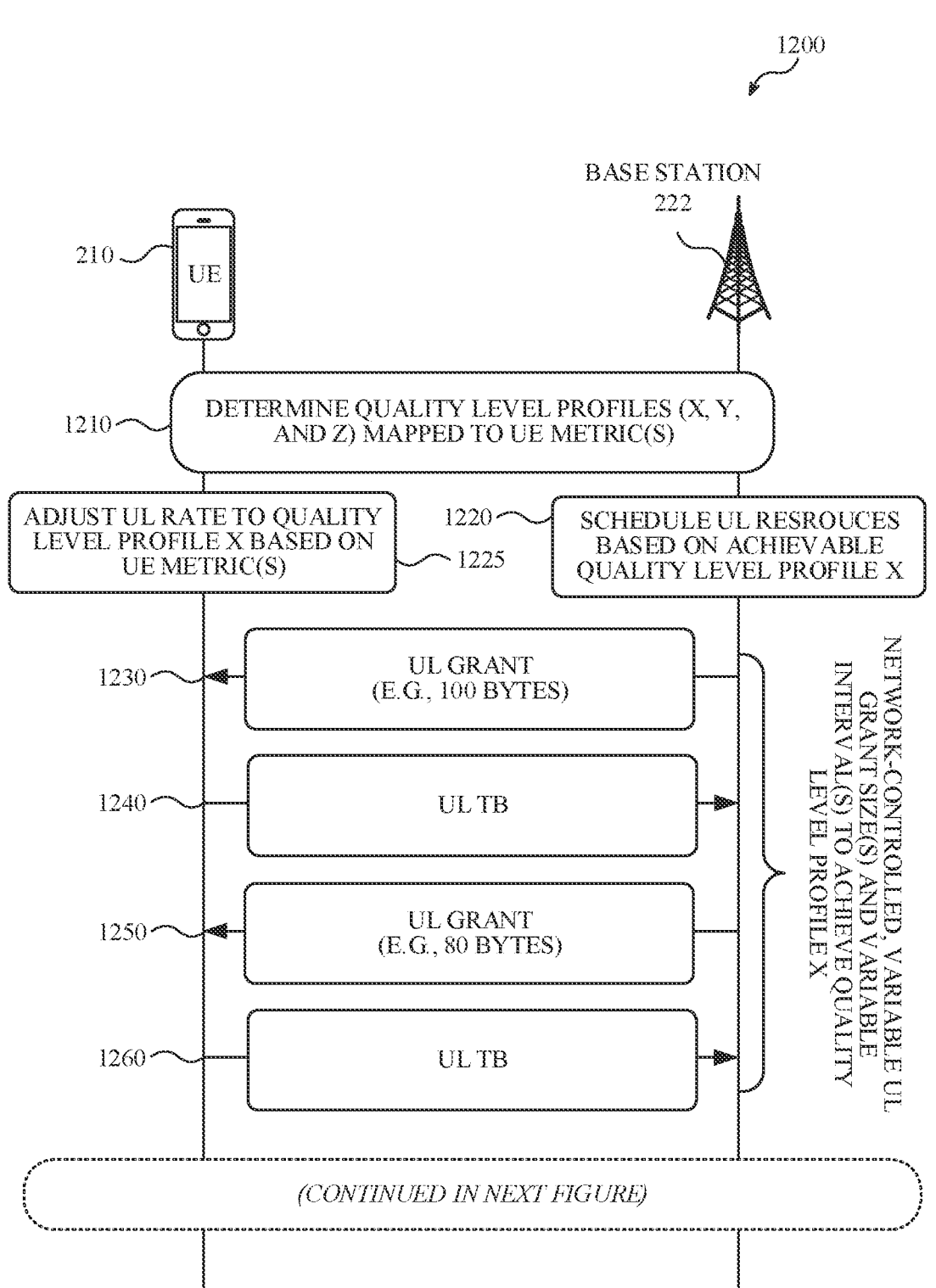
FIGS. 12-13 are diagrams of an example process for level-based network service quality scheduling without indications according to one or more implementations described herein.
Figure 13:
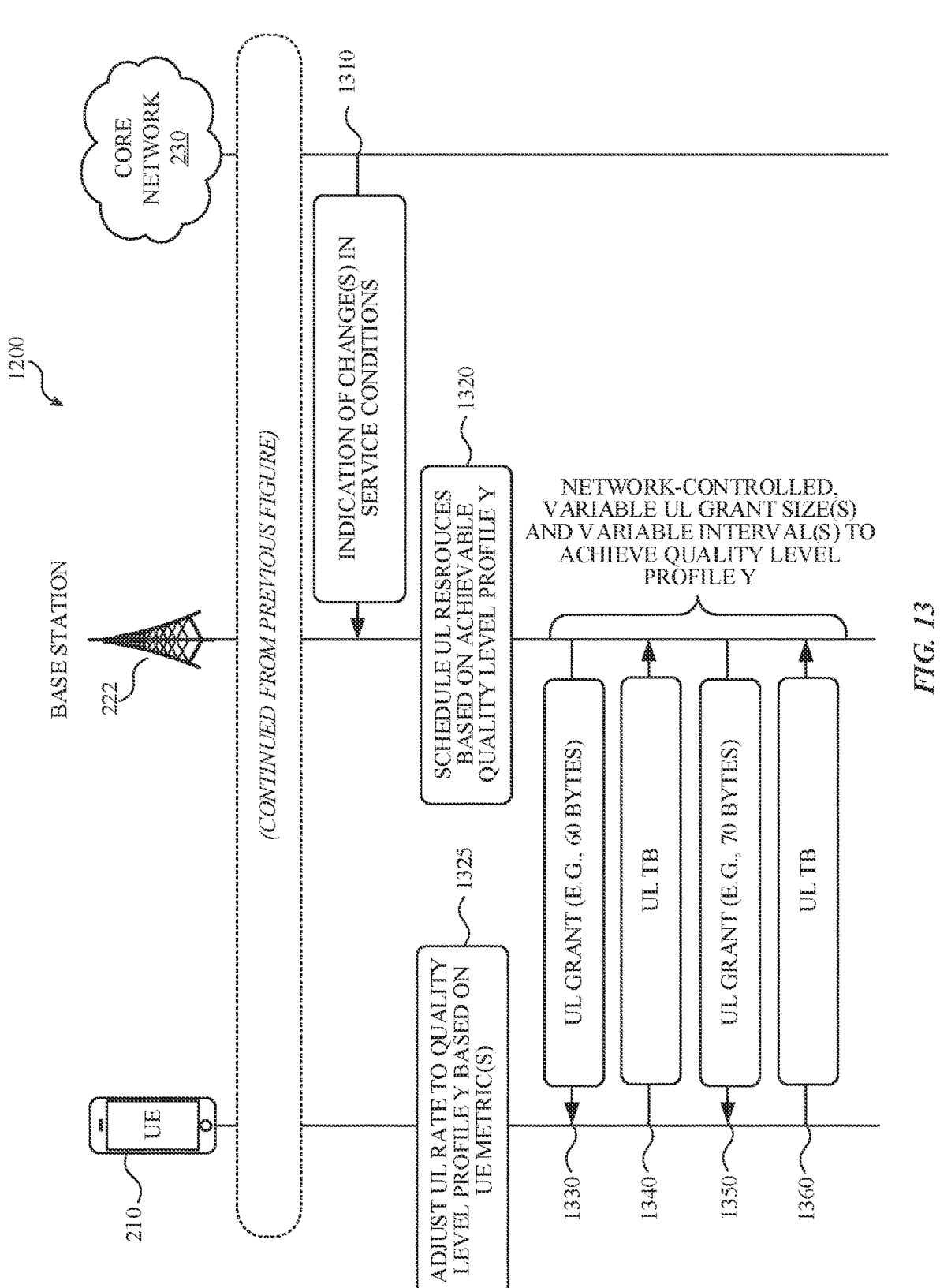

FIGS. 12-13 are diagrams of an example process 1200 for level-based network service scheduling without indications according to one or more implementations described herein. Process 1200 may be implemented by UE 210, one or more base stations 222, and CN 230. In some implementations, some or all of process 1200 may be performed by one or more other systems or devices, including one or more of the devices of FIGS. 2-3. Additionally, process 1200 may include one or more fewer, additional, differently ordered and/or arranged operations than those shown in FIGS. 12-13. In some implementations, some or all of the operations of process 1200 may be performed independently, successively, simultaneously, etc., of one or more of the other operations of process 1200. As such, the techniques described herein are not limited to a number, sequence, arrangement, timing, etc., of the operations or processes depicted in FIGS. 12-13.

As shown, process 1200 may include UE 210 and base station 222 operating to establish or determine quality level profiles that are mapped to one or more UE metrics (block 1210). This may include one or more communications and/or operations performed by UE 210 and base station 222. An example of determining quality level profiles mapped to UE metrics is discussed above in detail with reference to blocks 1110-1130 of FIG. 11).

Process 1200 may include base station 222 scheduling UL resources based on an achievable quality level profile (block 1220). For example, base station 222 may monitor and measure network conditions and determine which of the quality level profiles is most suitable. This may include base station 222 evaluating information about changes in service conditions from CN 230. For purposes of explaining process 900, assume that base station 222 determines that quality level profile X is most suitable of the quality level profiles.

Process 1200 may include UE 210 adjusting a UL rate according to quality level profile X based on UE metrics (block 1225). For example, UE 210 may measure an SINR (and/or another type of UE metric or condition associated with the quality level profiles) and determine which quality level profile corresponds to the measured SINR. For purposes of explaining process 1200, assume that UE 210 determines that the measured SINR corresponds to quality level profile X. As such, UE may adjust or conform the production, size, buffering, and transmission of packets according to quality level profile X.

Process 1200 may include base station 222 generating and communicating a UL grant to UE 210 (block 1230). The UL grant may indicate characteristics of UL transmissions, such as a TBS of 100 bytes associated with the UL grant. The UL resources indicated by the UL grant may be consistent with the quality level profile (quality level profile X) selected by base station 222, such that UE 210 may be able to infer which quality level profile is currently supported by the network.

Process 1200 may include UE 210 communicating with base station 222 via one or more UL TBs (block 1240). The UL transport blocks may be based on the UL grant, quality level profile, and/or UL resources indicated by base station 222. The UL transmission may involve the application, network service, data flow, LCH, etc., corresponding to the service quality profiles, UL grant, etc.

Process 1200 may include base station 222 generating and communicating another UL grant to UE 210 (block 1250). Base station 222 may generate the UL grant based on network conditions, application preferences, and/or one or more other factors periodically monitored, measured, and evaluated by base station 222. Prior to generating the UL grant, base station 222 may determine that the previously selected quality level profile is still suitable for network conditions. Similar to the prior UL grant, the UL grant may indicate characteristics of UL transmissions, such as a TBS of 80 bytes associated with the UL grant. The UL resources indicated by the UL grant may be consistent with the quality level profile (e.g., quality level profile X) selected by base station 222.

Process 1200 may include UE 210 communicating with base station 222 via one or more UL TBs (block 1260). The UL transport blocks may be based on the UL grant, quality level profile, and/or UL resources indicated by base station 222. The UL transmission may involve the application, network service, data flow, LCH, etc., corresponding to the service quality profiles, UL grant, etc. Accordingly, process 1200 may include network-control and variable UL grant sizes and intervals to achieve or support a selected quality level profile (e.g., quality level profile X).

Referring to FIG. 13, process 1200 may include base station 222 receiving an indication of a change in service conditions from CN 230 (block 1310). For example, CN 230 may communicate information to base station 222 about changes in an ability of CN 230 to continue supporting an application or network service at a given level of service (e.g., at a QoS). This may include an indication of a level of network congestion within CN 230, a change in a link or data flow associated with UE 210, etc. For example, UPF 330 may measure and monitor a bit rate, data throughput, latency, delay, packet loss, etc., relative to a particular data flow. UPF 330 may compare these characteristics to one or more thresholds to determine whether there has been a meaningful change in an ability of CN 230 to support the corresponding application or network service at a current QoS, bit rate, etc. Upon determining that a meaningful change has occurred, UPF 330 may provide information indicating the change to base station 222. In some implementations, one or more additional or alternative CN functions may be involved. Additionally, or alternatively, a device or entity outside of CN 230 (e.g., another UE, an application server, etc.) may provide this functionality.

Process 1200 may also include base station 222 scheduling UL resources based on an achievable quality level (block 1320). For example, base station 222 may monitor and measure network conditions and determine which of the quality level profiles is most suitable. This may include base station 222 evaluating information about changes in service conditions involving UE 210 and/or CN 230. For purposes of explaining process 1200, assume that base station 222 determines that quality level profile Y is more suitable than quality level profile X.

Process 1200 may include UE 210 adjusting a UL rate according to quality level profile Y based on UE metrics (block 1325). For example, UE 210 may measure an SINR (and/or another type of UE metric or condition associated with the quality level profiles) and determine which quality level profile corresponds to the measured SINR. For purposes of explaining process 1200, assume that UE 210 determines that the measured SINR no longer corresponds to quality level profile X but instead corresponds to quality level profile Y. As such, UE may adjust or conform the production, size, buffering, and transmission of packets according to quality level profile Y.

Process 1200 may include UE 210 adjusting a UL rate according to quality level profile Y based on UE metrics (block 1325). For example, UE 210 may measure an SINR (and/or another type of UE metric or condition associated with the quality level profiles) and determine which quality level profile corresponds to the measured SINR. For purposes of explaining process 1200, assume that UE 210 determines that the measured SINR no longer corresponds to quality level profile X but instead corresponds to quality level profile Y. As such, UE may adjust or conform the production, size, buffering, and transmission of packets according to quality level profile Y.

Process 1200 may include base station 222 generating and communicating a UL grant to UE 210 (block 1330). The UL grant may indicate characteristics of UL transmissions, such as a TBS of 60 bytes associated with the UL grant. The UL resources indicated by the UL grant may be consistent with the quality level profile (quality level profile Y) selected by base station 222, such that UE 210 may be able to infer which quality level profile is currently supported by the network.

Process 1200 may include UE 210 communicating with base station 222 via one or more UL TBs (block 1340). The UL transport blocks may be based on the UL grant, quality level profile, and/or UL resources indicated by base station 222. The UL transmission may involve the application, network service, data flow, LCH, etc., corresponding to the service quality profiles, UL grant, etc.

Process 1200 may include base station 222 generating and communicating another UL grant to UE 210 (block 1350). Base station 222 may generate the UL grant based on network conditions, application preferences, and/or one or more other factors periodically monitored, measured, and evaluated by base station 222. Prior to generating the UL grant, base station 222 may determine that the previously selected quality level profile is still suitable for network conditions. Similar to the prior UL grant, the UL grant may indicate characteristics of UL transmissions, such as a TBS of 70 bytes associated with the UL grant. The UL resources indicated by the UL grant may be consistent with the quality level profile (e.g., quality level profile Y) selected by base station 222.

Process 1200 may include UE 210 communicating with base station 222 via one or more UL TBs (block 1360). The UL transport blocks may be based on the UL grant, quality level profile, and/or UL resources indicated by base station 222. The UL transmission may involve the application, network service, data flow, LCH, etc., corresponding to the service quality profiles, UL grant, etc. Accordingly, process 1200 may include network-control and variable UL grant sizes and intervals to achieve or support a selected quality level profile (e.g., quality level profile Y).

Figure 14:
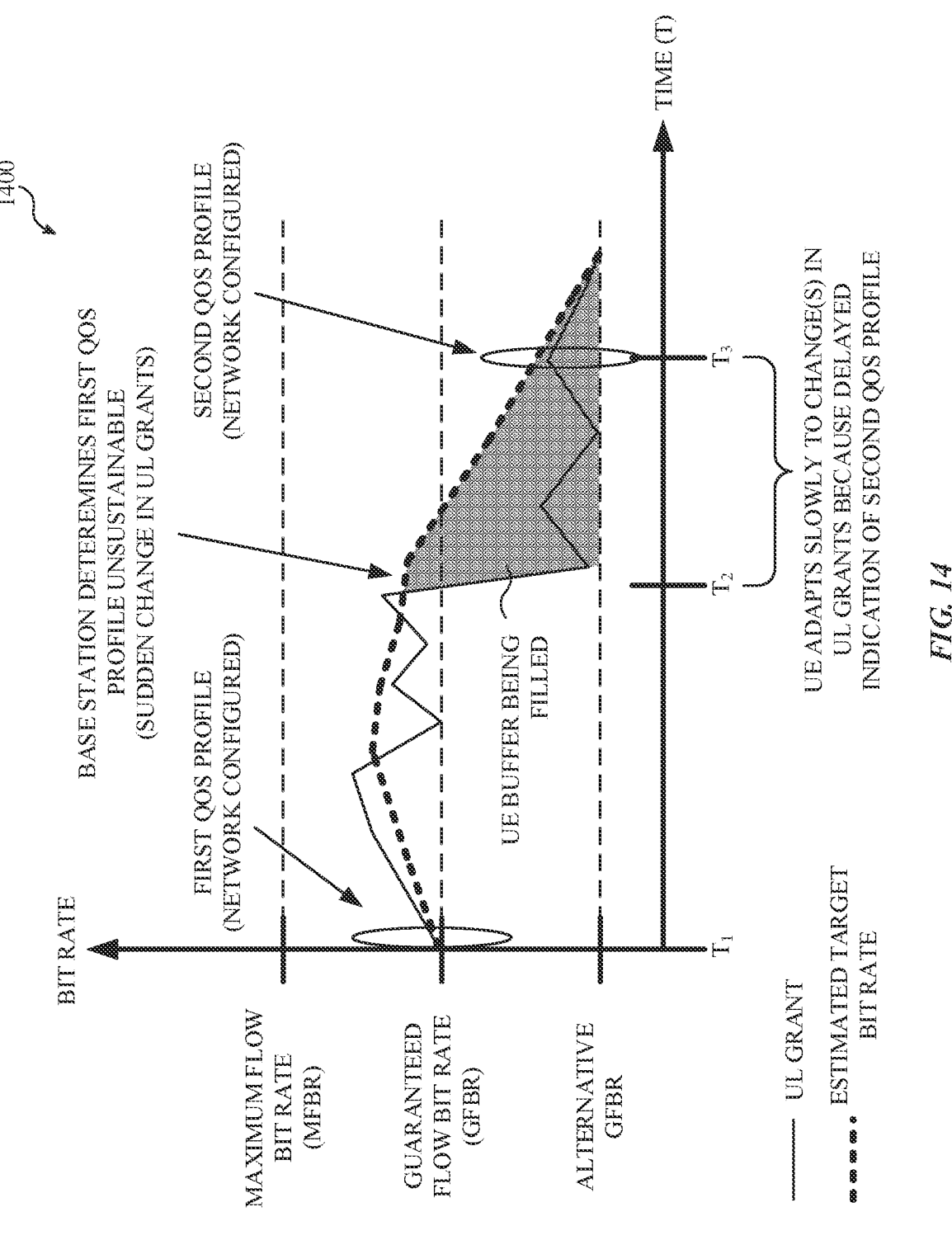
FIGS. 14-15 are diagrams of examples of non-level-based and level-based network service quality according to one or more implementations described herein.
Figure 15:
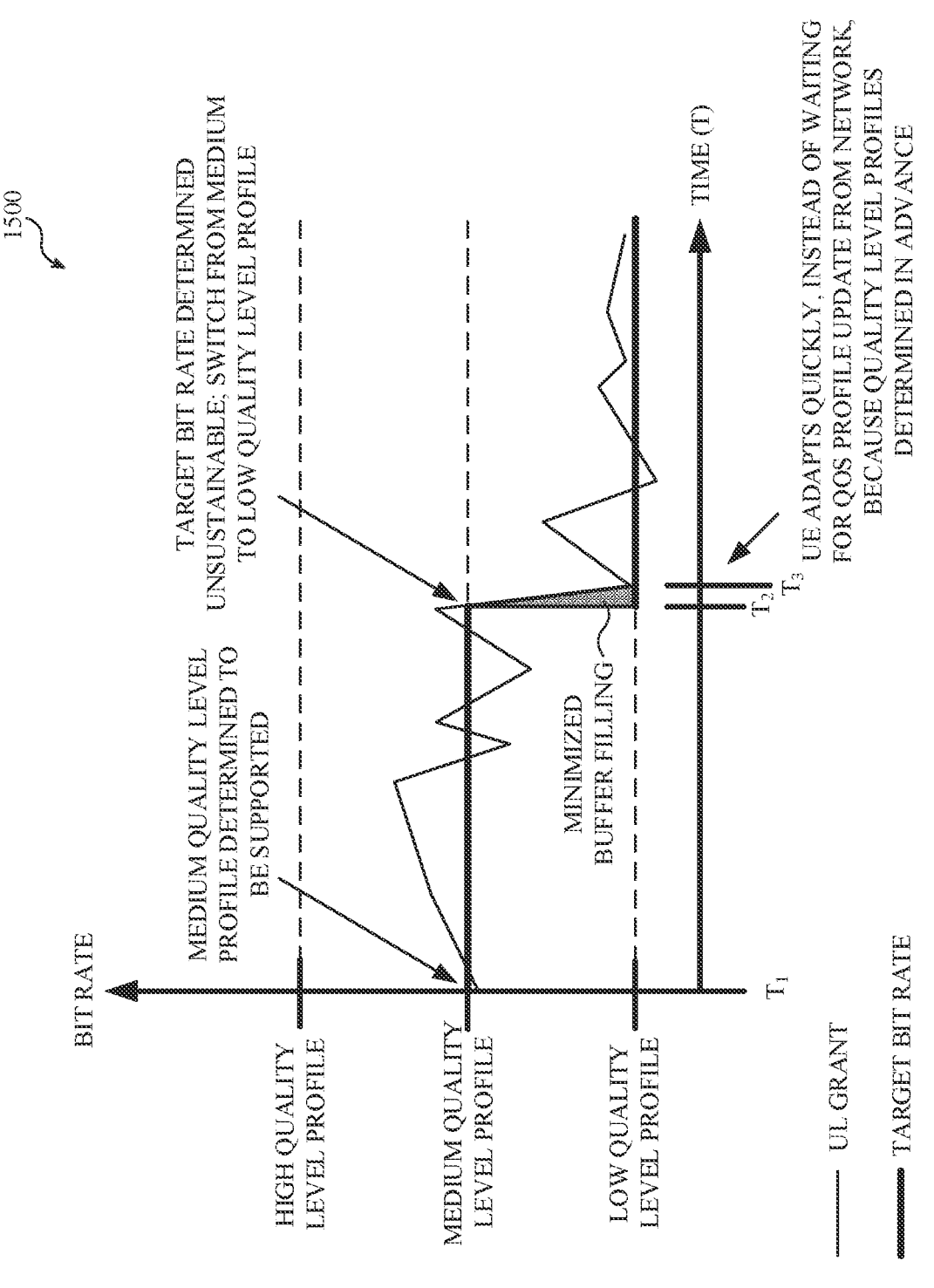

FIGS. 14-15 are diagrams of examples 1400 and 1500 of techniques for adapting to changes is network service quality. Example 1400 may include a non-level-based network service quality technique that does not involve quality level profiles. Example 1500 may include a level-based network service quality technique that does involve quality level profiles. As describe below the use of quality level profiles may enable UE 210 to adapt faster to changes in a target bit rate or QoS because UE 210 may respond faster to changes in a network service bit rate.

Example 1400 may include a table with a time extending along a horizontal axis and a bit rate extending along a vertical axis. The vertical axis may include an MFBR, GFBR, and alternative GFBR. The GFBR may correspond to a first QoS profile, and the alternative GFBR may correspond to a second or alternative QoS profile. The first and second QoS profiles may be part of the same GBR QoS flow.

At $T_1$, base station 222 may configure UE 210 with a first QoS profile with a GFBR. Base station 222 may provide UE 210 with UL grants consistent with the first QoS profile and corresponding GFBR. At $T_2$, base station 222 determine that the GFBR of the first QoS profile is unsustainable. As a result, base station 222 may modify UL grants to be consistent with the alternative GFBR of a second QoS profile. Base station 222 may also communication and negotiate with CN 230 to reconfigure a GBR QoS flow to be consistent with the second QoS profile.

Meanwhile, UE 210 may continue to generate and buffer packets consistent with the first QoS profile as a buffer of the UE becomes exhausted because of the differential between the size of the new UL grants and the production rates indicated by the GFBR of the first QoS profile. At $T_3$, base station 222 may indicate to UE 210 that a second QoS profile has been configured for the network, and UE 210 may transition to generating and buffering packets according to the GFBR of the second QoS profile. Accordingly, example 1400 may involve a significant lag between the time that base station 222 determines a need for a new QoS profile and the time that base station 222 notifies UE 210 of the new QoS profile, which may result in further delays, lost packets, greater latency, disruption in service, and so on.

Example 1500 may include a level-based network service quality technique that does involve quality level profiles. Example 1500 may include a table with a time extending along a horizontal axis and a bit rate extending along a vertical axis. The vertical axis may include a high quality level profile, a medium quality level profile, and a low quality level profile. The quality level profiles may correspond to data flow for a network service or application being accessed or executed by UE 210. UE 210 and base station 222 may each be aware of the quality level profiles.

At $T_1$, base station 222 may indicate (explicitly or implicitly) to UE 210 that the medium quality level profile is supported by the network. Base station 222 may therefore profile UL grants to UE 210 in accordance with a target bit rate of the medium quality level profile. At $T_2$, base station 222 may determine that a bit rate corresponding to the medium quality level profile is unsustainable. Base station 222 may also determine that the low quality level profile is more suitable for current network conditions. As a result, base station 222 may change UL grants for UE 210 to be consistent with low quality level profile. In some implementations, base station 222 may explicitly indicate to UE 210 that the low quality level profile is now supported by the network. In other implementations, UE 210 may independently determine that the low quality level profile is now supported by the network based on one or more metrics monitored or measured by UE 210. At T₃, UE 210 may also indicate to a transport layer and/or application associated with the data flow about the change from the medium quality level profile to the low quality level profile. As a result, UE 210 may decrease the rate at which packets are produced, the size of the packets, a size of a buffer for the packets, etc., accordance with the low quality level profile and/or change in UL grants from base station 222. Accordingly, UE 210 may use quality of level profiles determined in advance to quickly adapt to changes in network service, thereby minimizing delays, lost packets, greater latency, disruptions in service, and so on.

Figure 16:
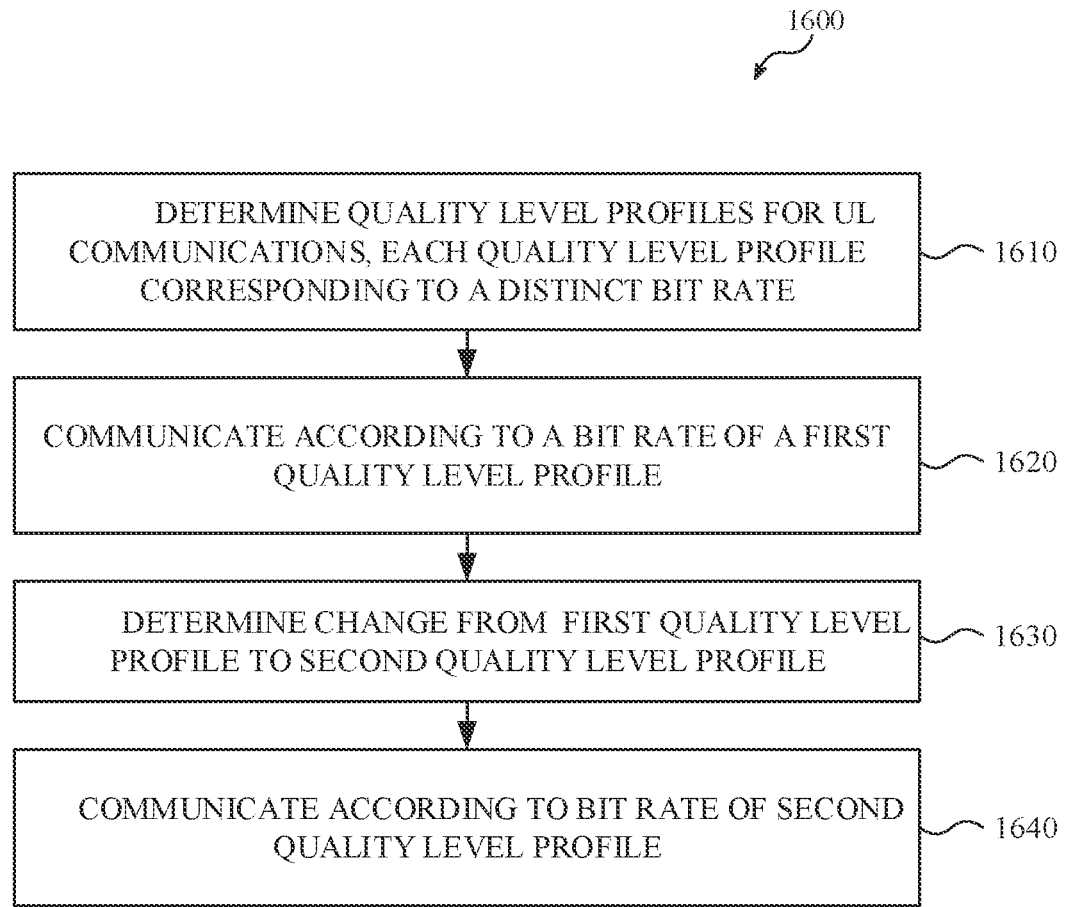
FIG. 16 is a diagram of an example process of level-based network service quality according to one or more implementations described herein.

FIG. 16 is a diagram of an example process 1600 of level-based network service quality according to one or more implementations described herein. Process 1600 may be implemented by UE 210. In some implementations, some or all of process 1600 may be performed by one or more other systems or devices, including one or more of the devices of FIG. 2. Additionally, process 1600 may include one or more fewer, additional, differently ordered and/or arranged operations than those shown in FIG. 16. In some implementations, some or all of the operations of process 1600 may be performed independently, successively, simultaneously, etc., of one or more of the other operations of process 1600. As such, the techniques described herein are not limited to a number, sequence, arrangement, timing, etc., of the operations or processes depicted in FIG. 16.

Process 1600 may include determining a plurality of quality level profiles for uplink (UL) communications involving a base station, each quality level profile, of the plurality of quality level profiles, corresponding to a distinct bit rate for UL transmissions (block 1610). Process 1600 may include communicating, with the base station, according to a bit rate of a first quality level profile of the plurality of quality level profiles (block 1620). Process 1600 may include determining a change from the first quality level profile to a second quality level profile of the plurality of quality level profiles (block 1630). Process 1600 may include communicating, with the base station, according to a bit rate of the second quality level profile, the bit rate of the first quality level profile being different than the bit rate of the second quality level profile.

FIG. 17 is a diagram of an example process 1700 of level-based network service quality according to one or more implementations described herein. Process 1700 may be implemented by one or more base stations 222. In some implementations, some or all of process 1700 may be performed by one or more other systems or devices, including one or more of the devices of FIG. 2. Additionally, process 1700 may include one or more fewer, additional, differently ordered and/or arranged operations than those shown in FIG. 17. In some implementations, some or all of the operations of process 1700 may be performed independently, successively, simultaneously, etc., of one or more of the other operations of process 1700. As such, the techniques described herein are not limited to a number, sequence, arrangement, timing, etc., of the operations or processes depicted in FIG. 17.

Process 1700 may include determining a plurality of quality level profiles for uplink (UL) communications involving a user equipment (UE), each quality level profile, of the plurality of quality level profiles, corresponding to a distinct bit rate for UL transmissions (block 1710). Process 1700 may include determining, based on one or more network conditions, an achievable quality level profile of the plurality of quality level profiles (block 1720). Process 1700 may include scheduling UL resources for a user equipment (UE) according to the achievable quality level profile (block 1730). Process 1700 may include determining, based on a change of the one or more network conditions, an alternative quality level profile of the plurality of quality level profiles (block 1740). Process 1700 may include scheduling UL resources for the UE according to the alternative quality level profile (block 1750).

Figure 18:
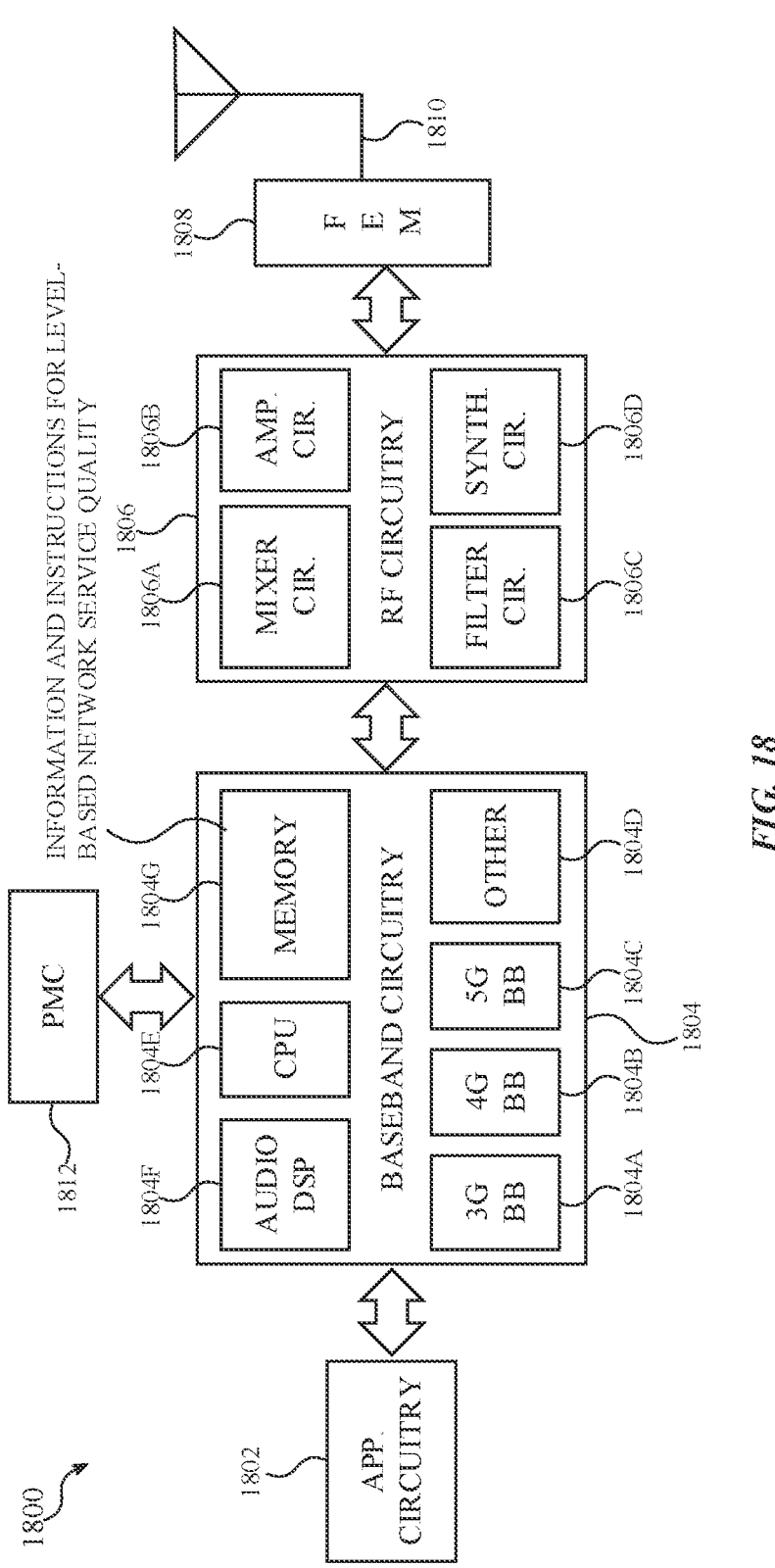
FIG. 18 is a diagram of an example of components of a device according to one or more implementations described herein.
Figure 19:
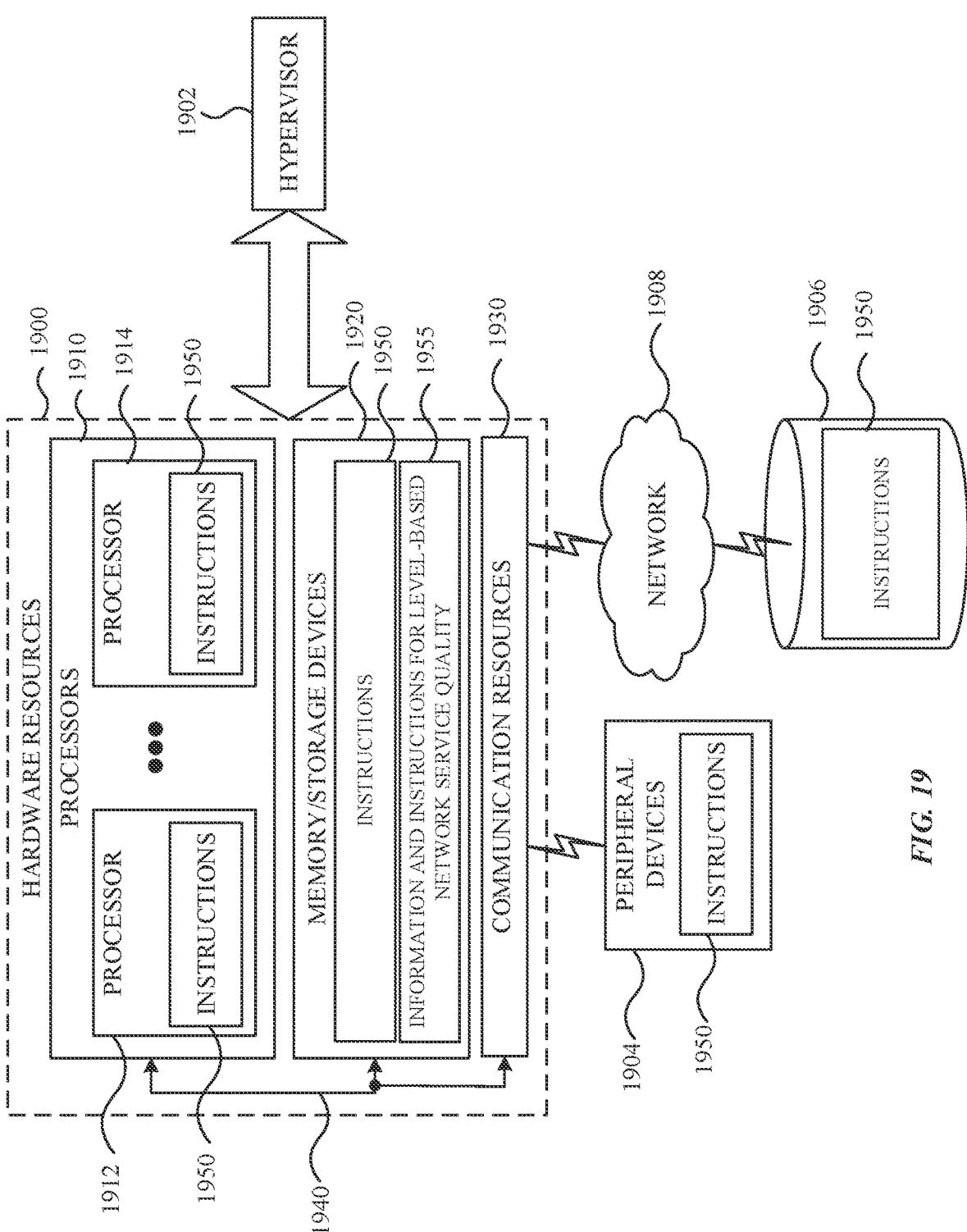
FIG. 19 is a block diagram illustrating components, according to one or more implementations described herein, able to read instructions from a machine-readable or computer-readable medium (e.g., a non-transitory machine-readable storage medium) and perform any one or more of the methodologies discussed herein.

FIG. 18 is a diagram of an example of components of a device according to one or more implementations described herein. In some implementations, the device 1800 can include application circuitry 1802, baseband circuitry 1804, RF circuitry 1806, front-end module (FEM) circuitry 1808, one or more antennas 1810, and power management circuitry (PMC) 1812 coupled together at least as shown. The components of the illustrated device 1800 can be included in a UE or a RAN node. In some implementations, the device 1800 can include fewer elements (e.g., a RAN node may not utilize application circuitry 1802, and instead include a processor/controller to process IP data received from a CN or an Evolved Packet Core (EPC)). In some implementations, the device 1800 can include additional elements such as, for example, memory/storage, display, camera, sensor (including one or more temperature sensors, such as a single temperature sensor, a plurality of temperature sensors at different locations in device 1800, etc.), or input/output (I/O) interface. In other implementations, the components described below can be included in more than one device (e.g., said circuitries can be separately included in more than one device for Cloud-RAN (C-RAN) implementations).

The application circuitry 1802 can include one or more application processors. For example, the application circuitry 1802 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1800. In some implementations, processors of application circuitry 1802 can process IP data packets received from an EPC.

The baseband circuitry 1804 can include circuitry such as, but not limited to, one or more single-core or multi-core processors. The baseband circuitry 1804 can include one or more baseband processors or control logic to process baseband signals received from a receive signal path of the RF circuitry 1806 and to generate baseband signals for a transmit signal path of the RF circuitry 1806. Baseband circuitry 1804 can interface with the application circuitry 1802 for generation and processing of the baseband signals and for controlling operations of the RF circuitry 1806. For example, in some implementations, the baseband circuitry 1804 can include a 3G baseband processor 1804A, a 4G baseband processor 1804B, a 5G baseband processor 1804C, or other baseband processor(s) 1804D for other existing generations, generations in development or to be developed in the future (e.g., 5G, 6G, etc.). The baseband circuitry 1804

(e.g., one or more of baseband processors 1804A-D) can handle various radio control functions that enable communication with one or more radio networks via the RF circuitry 1806. In other implementations, some or all of the functionality of baseband processors 1804A-D can be included in modules stored in the memory 1804G and executed via a Central Processing Unit (CPU) 1804E. The radio control functions can include, but are not limited to, signal modulation/demodulation, encoding/decoding, radio frequency shifting, etc. In some implementations, modulation/demodulation circuitry of the baseband circuitry 1804 can include Fast-Fourier Transform (FFT), precoding, or constellation mapping/de-mapping functionality. In some implementations, encoding/decoding circuitry of the baseband circuitry 1804 can include convolution, tail-biting convolution, turbo, Viterbi, or Low-Density Parity Check (LDPC) encoder/decoder functionality. Implementations of modulation/demodulation and encoder/decoder functionality are not limited to these examples and can include other suitable functionality in other implementations.

In some implementations, memory 1804G may receive and/or store information and instructions for level-based network service quality. UE 210 may determine multiple quality level profiles corresponding to an application, network service, or data flow. The quality level profiles may each include a different set of attributes relating to a QoS, such as a burst size, burst cadence, delay budget, etc. The UE may register the quality level profiles with base station 222, and base station 222 may provide service to UE 210 based on one of the quality level profiles. When network conditions change, and the current quality level profile is unsuitable, base station 222 may select a more suitable quality level profile and notify UE 210 of the change in quality level profile. UE 210 may then immediately begin adjusting UL transmissions in accordance with the new quality level profile. The information and instructions of memory 1804G may enable these and many other features and examples described herein.

In some implementations, the baseband circuitry 1804 can include one or more audio digital signal processor(s) (DSP) 1804F. The audio DSPs 1804F can include elements for compression/decompression and echo cancellation and can include other suitable processing elements in other implementations. Components of the baseband circuitry can be suitably combined in a single chip, a single chipset, or disposed on a same circuit board in some implementations. In some implementations, some or all of the constituent components of the baseband circuitry 1804 and the application circuitry 1802 can be implemented together such as, for example, on a system on a chip (SOC).

In some implementations, the baseband circuitry 1804 can provide for communication compatible with one or more radio technologies. For example, in some implementations, the baseband circuitry 1804 can support communication with a NG-RAN, an evolved universal terrestrial radio access network (EUTRAN) or other wireless metropolitan area networks (WMAN), a wireless local area network (WLAN), a wireless personal area network (WPAN), etc. Implementations in which the baseband circuitry 1804 is configured to support radio communications of more than one wireless protocol can be referred to as multi-mode baseband circuitry.

RF circuitry 1806 can enable communication with wireless networks using modulated electromagnetic radiation through a non-solid medium. In various implementations, the RF circuitry 1806 can include switches, filters, amplifiers, etc. to facilitate the communication with the wireless network. RF circuitry 1806 can include a receive signal path which can include circuitry to down-convert RF signals received from the FEM circuitry 1808 and provide baseband signals to the baseband circuitry 1804. RF circuitry 1806 can also include a transmit signal path which can include circuitry to up-convert baseband signals provided by the baseband circuitry 1804 and provide RF output signals to the FEM circuitry 1808 for transmission.

In some implementations, the receive signal path of the RF circuitry 1806 can include mixer circuitry 1806A, amplifier circuitry 1806B and filter circuitry 1806C. In some implementations, the transmit signal path of the RF circuitry 1806 can include filter circuitry 1806C and mixer circuitry 1806A. RF circuitry 1806 can also include synthesizer circuitry 1806D for synthesizing a frequency for use by the mixer circuitry 1806A of the receive signal path and the transmit signal path. In some implementations, the mixer circuitry 1806A of the receive signal path can be configured to down-convert RF signals received from the FEM circuitry 1808 based on the synthesized frequency provided by synthesizer circuitry 1806D. The amplifier circuitry 1806B can be configured to amplify the down-converted signals and the filter circuitry 1806C can be a low-pass filter (LPF) or band-pass filter (BPF) configured to remove unwanted signals from the down-converted signals to generate output baseband signals. Output baseband signals can be provided to the baseband circuitry 1804 for further processing. In some implementations, the output baseband signals can be zero-frequency baseband signals, although this is not a requirement. In some implementations, mixer circuitry 1806A of the receive signal path can comprise passive mixers, although the scope of the implementations is not limited in this respect.

In some implementations, the mixer circuitry 1806A of the transmit signal path can be configured to up-convert input baseband signals based on the synthesized frequency provided by the synthesizer circuitry 1806D to generate RF output signals for the FEM circuitry 1808. The baseband signals can be provided by the baseband circuitry 1804 and can be filtered by filter circuitry 1806C.

In some implementations, the mixer circuitry 1806A of the receive signal path and the mixer circuitry 1806A of the transmit signal path can include two or more mixers and can be arranged for quadrature down conversion and up conversion, respectively. In some implementations, the mixer circuitry 1806A of the receive signal path and the mixer circuitry 1806A of the transmit signal path can include two or more mixers and can be arranged for image rejection (e.g., Hartley image rejection). In some implementations, the mixer circuitry 1806A of the receive signal path and the mixer circuitry 1406A can be arranged for direct down conversion and direct up conversion, respectively. In some implementations, the mixer circuitry 1806A of the receive signal path and the mixer circuitry 1806A of the transmit signal path can be configured for super-heterodyne operation.

In some implementations, the output baseband signals, and the input baseband signals can be analog baseband signals, although the scope of the implementations is not limited in this respect. In some alternate implementations, the output baseband signals, and the input baseband signals can be digital baseband signals. In these alternate implementations, the RF circuitry 1806 can include analog-to-digital converter (ADC) and digital-to-analog converter (DAC) circuitry and the baseband circuitry 1804 can include a digital baseband interface to communicate with the RF circuitry 1806.

In some dual-mode implementations, a separate radio IC circuitry can be provided for processing signals for each spectrum, although the scope of the implementations is not limited in this respect.

In some implementations, the synthesizer circuitry 1806D can be a fractional-N synthesizer or a fractional N/N+1 synthesizer, although the scope of the implementations is not limited in this respect as other types of frequency synthesizers can be suitable. For example, synthesizer circuitry 1806D can be a delta-sigma synthesizer, a frequency multiplier, or a synthesizer comprising a phase-locked loop with a frequency divider.

The synthesizer circuitry 1806D can be configured to synthesize an output frequency for use by the mixer circuitry 1806A of the RF circuitry 1806 based on a frequency input and a divider control input. In some implementations, the synthesizer circuitry 1806D can be a fractional N/N+1 synthesizer.

In some implementations, frequency input can be provided by a voltage-controlled oscillator (VCO), although that is not a requirement. Divider control input can be provided by either the baseband circuitry 1804 or the applications circuitry 1802 depending on the desired output frequency. In some implementations, a divider control input (e.g., N) can be determined from a look-up table based on a channel indicated by the applications circuitry 1802.

Synthesizer circuitry 1806D of the RF circuitry 1806 can include a divider, a delay-locked loop (DLL), a multiplexer and a phase accumulator. In some implementations, the divider can be a dual modulus divider (DMD) and the phase accumulator can be a digital phase accumulator (DPA). In some implementations, the DMD can be configured to divide the input signal by either N or N+1 (e.g., based on a carry out) to provide a fractional division ratio. In some example implementations, the DLL can include a set of cascaded, tunable, delay elements, a phase detector, a charge pump and a D-type flip-flop. In these implementations, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 1806D can be configured to generate a carrier frequency as the output frequency, while in other implementations, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency can be a LO frequency (fLO). In some implementations, the RF circuitry 1806 can include an IQ/polar converter.

FEM circuitry 1808 can include a receive signal path which can include circuitry configured to operate on RF signals received from one or more antennas 1810, amplify the received signals and provide the amplified versions of the received signals to the RF circuitry 1806 for further processing. FEM circuitry 1808 can also include a transmit signal path which can include circuitry configured to amplify signals for transmission provided by the RF circuitry 1806 for transmission by one or more of the one or more antennas 1810. In various implementations, the amplification through the transmit or receive signal paths can be done solely in the RF circuitry 1806, solely in the FEM circuitry 1808, or in both the RF circuitry 1806 and the FEM circuitry 1808.

In some implementations, the FEM circuitry 1808 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1806). The transmit signal path of the FEM circuitry 1808 can include a power amplifier (PA) to amplify input RF signals (e.g., provided by RF circuitry 1806), and one or more filters to generate RF signals for subsequent transmission (e.g., by one or more of the one or more antennas 1810).

In some implementations, the PMC 1812 can manage power provided to the baseband circuitry 1804. In particular, the PMC 1812 can control power-source selection, voltage scaling, battery charging, or DC-to-DC conversion. The PMC 1812 can often be included when the device 1800 is capable of being powered by a battery, for example, when the device is included in a UE. The PMC 1812 can increase the power conversion efficiency while providing desirable implementation size and heat dissipation characteristics.

While FIG. 18 shows the PMC 1812 coupled only with the baseband circuitry 1804. However, in other implementations, the PMC 1812 may be additionally or alternatively coupled with, and perform similar power management operations for, other components such as, but not limited to, application circuitry 1802, RF circuitry 1806, or FEM circuitry 1808.

In some implementations, the PMC 1812 can control, or otherwise be part of, various power saving mechanisms of the device 1800. For example, if the device 1800 is in an RRC_Connected state, where it is still connected to the RAN node as it expects to receive traffic shortly, then it can enter a state known as Discontinuous Reception Mode (DRX) after a period of inactivity. During this state, the device 1800 can power down for brief intervals of time and thus save power.

If there is no data traffic activity for an extended period of time, then the device 1800 can transition off to an RRC_Idle state, where it disconnects from the network and does not perform operations such as channel quality feedback, handover, etc. The device 1800 goes into a very low power state and it performs paging where again it periodically wakes up to listen to the network and then powers down again. The device 1800 may not receive data in this state; in order to receive data, it can transition back to RRC_Connected state.

An additional power saving mode can allow a device to be unavailable to the network for periods longer than a paging interval (ranging from seconds to a few hours). During this time, the device is unreachable to the network and can power down completely. Any data sent during this time incurs a large delay and it is assumed the delay is acceptable.

Processors of the application circuitry 1802 and processors of the baseband circuitry 1804 can be used to execute elements of one or more instances of a protocol stack. For example, processors of the baseband circuitry 1804, alone or in combination, can be used execute Layer 3, Layer 2, or Layer 1 functionality, while processors of the baseband circuitry 1804 can utilize data (e.g., packet data) received from these layers and further execute Layer 4 functionality (e.g., transmission communication protocol (TCP) and user datagram protocol (UDP) layers). As referred to herein, Layer 3 can comprise a RRC layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

FIG. 18 is a block diagram illustrating components, according to some example implementations, able to read instructions from a machine-readable or computer-readable medium (e.g., a non-transitory machine-readable storage medium) and perform any one or more of the methodologies discussed herein. Specifically, FIG. 18 shows a diagrammatic representation of hardware resources 1800 including one or more processors (or processor cores) 1810, one or more memory/storage devices 1820, and one or more communication resources 1830, each of which may be communicatively coupled via a bus 1840. For implementations where node virtualization (e.g., NFV) is utilized, a hypervisor may be executed to provide an execution environment for one or more network slices/sub-slices to utilize the hardware resources 1800.

The processors 1810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1812 and a processor 1814.

The memory/storage devices 1820 may include main memory, disk storage, or any suitable combination thereof. The memory/storage devices 1820 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

In some implementations, memory/storage devices 1820 receive and/or store information and instructions 1855 for level-based network service quality. UE 210 may determine multiple quality level profiles corresponding to an application, network service, or data flow. The quality level profiles may each include a different set of attributes relating to a QoS, such as a burst size, burst cadence, delay budget, etc. The UE may register the quality level profiles with base station 222, and base station 222 may provide service to UE 210 based on one of the quality level profiles. When network conditions change, and the current quality level profile is unsuitable, base station 222 may select a more suitable quality level profile and notify UE 210 of the change in quality level profile. UE 210 may then immediately begin adjusting UL transmissions in accordance with the new quality level profile. Information and instructions 1855 may enable these and many other features and examples described herein.

The communication resources 1830 may include interconnection or network interface components or other suitable devices to communicate with one or more peripheral devices 1804 or one or more databases 1806 via a network 1808. For example, the communication resources 1830 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1850 may comprise software, a program, an application, an applet, an app, or other executable code for causing at least any of the processors 1810 to perform any one or more of the methodologies discussed herein. The instructions 1850 may reside, completely or partially, within at least one of the processors 1810 (e.g., within the processor's cache memory), the memory/storage devices 1820, or any suitable combination thereof. Furthermore, any portion of the instructions 1850 may be transferred to the hardware resources 1800 from any combination of the peripheral devices 1804 or the databases 1806. Accordingly, the memory of processors 1810, the memory/storage devices 1820, the peripheral devices 1804, and the databases 1806 are examples of computer-readable and machine-readable media.

Examples and/or implementations herein may include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to implementations and examples described.

In example 1, which may also include one or more of the examples described herein, a user device (UE) may comprise: a memory; and one or more processors configured to, when executing instructions stored in the memory, cause the UE to: determine a plurality of quality level profiles for uplink (UL) communications involving a base station, each quality level profile, of the plurality of quality level profiles, corresponding to a distinct bit rate for UL transmissions; communicate, with the base station, according to a bit rate of a first quality level profile of the plurality of quality level profiles; determine a change from the first quality level profile to a second quality level profile of the plurality of quality level profiles; and communicate, with the base station, according to a bit rate of the second quality level profile, the bit rate of the first quality level profile being different than the bit rate of the second quality level profile.

In example 2, which may also include one or more of the examples described herein, the bit rate of the first quality level profile corresponds to a first set of parameters defining a first quality of service (QoS) and the second quality level profile corresponds to a second set of parameters defining a second QoS.

In example 3, which may also include one or more of the examples described herein, the first set of parameters comprises a first burst size, a first burst cadence, and a first delay budget and the second set of parameters comprises a second burst size, a second burst cadence, and a second delay budget.

In example 4, which may also include one or more of the examples described herein, the bit rate of the first quality level profile comprises a first guaranteed flow bit rate (GFBR) and the bit rate of the second quality level profile comprises a second GFBR.

In example 5, which may also include one or more of the examples described herein, the plurality of quality level profiles is determined by the UE providing the plurality of quality level profiles to the base station.

In example 6, which may also include one or more of the examples described herein, one or more quality level profiles, of the plurality of quality level profiles, are provided to the base station via a media access control (MAC) control element (CE), a buffer status report (BSR), a radio resource control (RRC) message, or network access stratum (NAS) signaling.

In example 7, which may also include one or more of the examples described herein, the plurality of quality level profiles are provided to the base station using a plurality of weighted factors, each weighted factor of the plurality of weighted factors corresponding to a different quality level profile of the plurality of quality level profiles.

In example 8, which may also include one or more of the examples described herein, the change from the first quality level profile to the second quality level profile is determined based on an explicit indication received from the base station.

In example 9, which may also include one or more of the examples described herein, the change from the first quality level profile to the second quality level profile is determined based on an implicit indication received from the base station.

In example 10, which may also include one or more of the examples described herein, the implicit indication comprises one or more UE metrics associated with the first quality level profile and one or more UE metrics associated with the second quality level profile.

In example 11, which may also include one or more of the examples described herein, each of the one or more UE metrics associated with the first quality level profile and the one or more UE metrics associated with the second quality level profile comprises at least one of a signal interference noise ratio (SINR), a reference signal received power (RSRP), or a reference signal received quality (RSRQ).

In example 12, which may also include one or more of the examples described herein, a base station may comprise: a memory; and one or more processors configured to, when executing instructions stored in the memory, cause the base station to: determine a plurality of quality level profiles for uplink (UL) communications involving a user equipment (UE), each quality level profile, of the plurality of quality level profiles, corresponding to a distinct bit rate for UL transmissions; determine, based on one or more network conditions, an achievable quality level profile of the plurality of quality level profiles; schedule UL resources for a user equipment (UE) according to the achievable quality level profile; determine, based on a change of the one or more network conditions, an alternative quality level profile of the plurality of quality level profiles; and schedule UL resources for the UE according to the alternative quality level profile.

In example 13, which may also include one or more of the examples described herein, the bit rate of the achievable quality level profile corresponds to a first set of parameters of a first quality of service (QoS) and the alternative quality level profile corresponds to a second set of parameters of a second QoS.

In example 14, which may also include one or more of the examples described herein, the first set of parameters comprises a first burst size, a first burst cadence, and a first delay budget and the second set of parameters comprises a second burst size, a second burst cadence, and a second delay budget.

In example 15, which may also include one or more of the examples described herein, the bit rate of the achievable quality level profile comprises a first guaranteed flow bit rate (GFBR) and the bit rate of the alternative quality level profile comprises a second GFBR.

In example 16, which may also include one or more of the examples described herein, the plurality of quality level profiles are determined by receiving the plurality of quality level profiles from the UE.

In example 17, which may also include one or more of the examples described herein, one or more quality level profiles, of the plurality of quality level profiles, are provided to the base station via a media access control (MAC) control element (CE), buffer status report (BSR), a radio resource control (RRC) message, or network access stratum (NAS) signaling.

In example 18, which may also include one or more of the examples described herein, the plurality of quality level profiles are provided to the base station using a plurality of weighted factors, each weighted factor of the plurality of weighted factors corresponding to a different quality level profile of the plurality of quality level profiles.

In example 19, which may also include one or more of the examples described herein, the plurality of quality level profiles is determined by receiving a first set of quality level profiles from the UE, determining that the first set of quality level profiles are unsuitable, determining a second set of quality level profiles, and communicating the second set of quality level profiles to the UE.

In example 20, which may also include one or more of the examples described herein, the base station is to provide an explicit indication to the UE of a change from the achievable quality level profile to the alternative quality level profile.

In example 21, which may also include one or more of the examples described herein, the base station is to provide the UE with a mapping of one or more UE metrics associated with the achievable quality level profile and one or more UE metrics associated with the alternative quality level profile.

In example 22, which may also include one or more of the examples described herein, each of the one or more UE metrics associated with the achievable quality level profile and the one or more UE metrics associated with the alternative quality level profile comprises at least one of a signal interference noise ratio (SINR), a reference signal received power (RSRP), or a reference signal received quality (RSRQ).

In example 23, which may also include one or more of the examples described herein, a baseband processor may comprise: a memory; and one or more processors configured to, when executing instructions stored in the memory, cause the baseband processor to: determine a plurality of quality level profiles for uplink (UL) communications involving a base station, each quality level profile, of the plurality of quality level profiles, corresponding to a distinct bit rate for UL transmissions; cause a transceiver to communicate, with the base station, according to a bit rate of a first quality level profile of the plurality of quality level profiles; determine a change from the first quality level profile to a second quality level profile of the plurality of quality level profiles; and cause a transceiver to communicate, with the base station, according to a bit rate of the second quality level profile, the bit rate of the first quality level profile being different that the bit rate of the second quality level profile.

In example 24, which may also include one or more of the examples described herein, the bit rate of the first quality level profile comprises a first set of parameters defining a first quality of service (QoS) and the second quality level profile comprise a second set of parameters defining a second QoS.

In example 25, which may also include one or more of the examples described herein, a method, performed by a user equipment (UE), may comprise: determining a plurality of quality level profiles for uplink (UL) communications involving a base station, each quality level profile, of the plurality of quality level profiles, corresponding to a distinct bit rate for UL transmissions; communicating, with the base station, according to a bit rate of a first quality level profile of the plurality of quality level profiles; determining a change from the first quality level profile to a second quality level profile of the plurality of quality level profiles; and communicating, with the base station, according to a bit rate of the second quality level profile, the bit rate of the first quality level profile being different than the bit rate of the second quality level profile.

In example 26, which may also include one or more of the examples described herein, the bit rate of the first quality level profile corresponds to a first set of parameters defining a first quality of service (QoS) and the second quality level profile corresponds to a second set of parameters defining a second QoS.

In example 27, which may also include one or more of the examples described herein, a method, performed by a base station, may comprise: determining a plurality of quality level profiles for uplink (UL) communications involving a user equipment (UE), each quality level profile, of the plurality of quality level profiles, corresponding to a distinct bit rate for UL transmissions; determining, based on one or more network conditions, an achievable quality level profile of the plurality of quality level profiles; scheduling UL resources for a user equipment (UE) according to the achievable quality level profile; determining, based on a change of the one or more network conditions, an alternative quality level profile of the plurality of quality level profiles; and scheduling UL resources for the UE according to the alternative quality level profile.

In example 28, which may also include one or more of the examples described herein, the bit rate of the achievable quality level profile corresponds to a first set of parameters of a first quality of service (QoS) and the alternative quality level profile corresponds to a second set of parameters of a second QoS.

The examples discussed above also extend to method, computer-readable medium, and means-plus-function claims and implementations, an of which may include one or more of the features or operations of any one or combination of the examples mentioned above.

The above description of illustrated examples, implementations, aspects, etc., of the subject disclosure, including what is described in the Abstract, is not intended to be exhaustive or to limit the disclosed aspects to the precise forms disclosed. While specific examples, implementations, aspects, etc., are described herein for illustrative purposes, various modifications are possible that are considered within the scope of such examples, implementations, aspects, etc., as those skilled in the relevant art can recognize.

In this regard, while the disclosed subject matter has been described in connection with various examples, implementations, aspects, etc., and corresponding Figures, where applicable, it is to be understood that other similar aspects can be used or modifications and additions can be made to the disclosed subject matter for performing the same, similar, alternative, or substitute function of the subject matter without deviating therefrom. Therefore, the disclosed subject matter should not be limited to any single example, implementation, or aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given application.

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items can be distinct, or they can be the same, although in some situations the context may indicate that they are distinct or that they are the same.

It is well understood that the use of personally identifiable information should follow privacy policies and practices that are generally recognized as meeting or exceeding industry or governmental requirements for maintaining the privacy of users. In particular, personally identifiable information data should be managed and handled to minimize risks of unintentional or unauthorized access or use, and the nature of authorized use should be clearly indicated to users.

What is claimed is:
1. A user device (UE), comprising:
a memory; and
one or more processors configured to, when executing instructions stored in the memory, cause the UE to:
  determine a plurality of quality level profiles for uplink (UL) communications of the UE with a base station, each quality level profile, of the plurality of quality level profiles, corresponding to a distinct bit rate for UL transmissions, wherein determining the plurality of quality level profiles includes:
    providing a first set of quality level profiles to the base station; and
    determining, as the plurality of quality level profiles, either:
      the first set of quality level profiles; or
      a second set of quality level profiles received from the base station in response to the first set of quality level profiles;
  communicate, with the base station, according to a bit rate of a first quality level profile of the plurality of quality level profiles;
  determine a change from the first quality level profile to a second quality level profile of the plurality of quality level profiles; and
  communicate, with the base station, according to a bit rate of the second quality level profile, the bit rate of the first quality level profile being different than the bit rate of the second quality level profile.
2. The UE of claim 1, wherein the bit rate of the first quality level profile corresponds to a first set of parameters defining a first quality of service (QOS) and the second quality level profile corresponds to a second set of parameters defining a second QoS.

3. The UE of claim 2, wherein the first set of parameters comprises a first burst size, a first burst cadence, and a first delay budget and the second set of parameters comprises a second burst size, a second burst cadence, and a second delay budget.

4. The UE of claim 1, wherein the bit rate of the first quality level profile comprises a first guaranteed flow bit rate (GFBR) and the bit rate of the second quality level profile comprises a second GFBR.

5. The UE of claim 1, wherein one or more quality level profiles, of the first set of quality level profiles, are provided to the base station via a media access control (MAC) control element (CE), a buffer status report (BSR), a radio resource control (RRC) message, or network access stratum (NAS) signaling.

6. The UE of claim 1, wherein the first set of quality level profiles is provided to the base station using a plurality of weighted factors, each weighted factor of the plurality of weighted factors corresponding to a different quality level profile of the first set of quality level profiles.

7. The UE of claim 1, wherein the change from the first quality level profile to the second quality level profile is determined based on an explicit indication received from the base station.

8. The UE of claim 1, wherein the change from the first quality level profile to the second quality level profile is determined based on an implicit indication received from the base station.

9. The UE of claim 8, wherein the implicit indication comprises one or more UE metrics associated with the first quality level profile and one or more UE metrics associated with the second quality level profile.

10. The UE of claim 9, wherein each of the one or more UE metrics associated with the first quality level profile and the one or more UE metrics associated with the second quality level profile comprises at least one of a signal interference noise ratio (SINR), a reference signal received power (RSRP), or a reference signal received quality (RSRQ).

11. A base station, comprising:
a memory; and
one or more processors configured to, when executing instructions stored in the memory, cause the base station to:
determine a plurality of quality level profiles for uplink (UL) communications of a user equipment (UE) with the base station, each quality level profile, of the plurality of quality level profiles, corresponding to a distinct bit rate for UL transmissions, wherein determining the plurality of quality level profiles includes:
receiving a first set of quality level profiles from the UE; and
either:
determining, as the plurality of quality level profiles, the first set of quality level profiles; or
providing a second set of quality level profiles to the UE and determining, as the plurality of quality level profiles, the second set of quality level profiles;
determine, based on one or more network conditions, an achievable quality level profile of the plurality of quality level profiles;

schedule UL resources for the UE according to the achievable quality level profile;
determine, based on a change of the one or more network conditions, an alternative quality level profile of the plurality of quality level profiles; and
schedule UL resources for the UE according to the alternative quality level profile.

12. The base station of claim 11, wherein a bit rate of the achievable quality level profile corresponds to a first set of parameters of a first quality of service (QOS) and the alternative quality level profile corresponds to a second set of parameters of a second QoS.

13. The base station of claim 12, wherein the first set of parameters comprises a first burst size, a first burst cadence, and a first delay budget and the second set of parameters comprises a second burst size, a second burst cadence, and a second delay budget.

14. The base station of claim 11, wherein a bit rate of the achievable quality level profile comprises a first guaranteed flow bit rate (GFBR) and a bit rate of the alternative quality level profile comprises a second GFBR.

15. The base station of claim 11, wherein one or more quality level profiles, of the first set of quality level profiles, are provided to the base station via a media access control (MAC) control element (CE), buffer status report (BSR), a radio resource control (RRC) message, or network access stratum (NAS) signaling.

16. The base station of claim 11, wherein the first set of quality level profiles is provided to the base station using a plurality of weighted factors, each weighted factor of the plurality of weighted factors corresponding to a different quality level profile of the first set of quality level profiles.

17. A baseband processor for a user equipment (UE), comprising:
a memory; and
one or more processors configured to, when executing instructions stored in the memory, cause the baseband processor to:
determine a plurality of quality level profiles for uplink (UL) communications of the UE with a base station, each quality level profile, of the plurality of quality level profiles, corresponding to a distinct bit rate for UL transmissions, wherein determining the plurality of quality level profiles includes:
providing a first set of quality level profiles to the base station; and
determining, as the plurality of quality level profiles, either:
the first set of quality level profiles; or
a second set of quality level profiles received from the base station in response to the first set of quality level profiles;
cause a transceiver to communicate, with the base station, according to a bit rate of a first quality level profile of the plurality of quality level profiles;
determine a change from the first quality level profile to a second quality level profile of the plurality of quality level profiles; and
cause a transceiver to communicate, with the base station, according to a bit rate of the second quality level profile, the bit rate of the first quality level profile being different that the bit rate of the second quality level profile.

* * * * *